United States Patent
Funke et al.

(10) Patent No.: US 12,128,878 B1
(45) Date of Patent: Oct. 29, 2024

(54) FLEET CONTROL FOR PARKING SPACE SELECTION

(71) Applicant: Zoox, Inc., Foster City, CA (US)

(72) Inventors: Joseph Funke, Redwood City, CA (US); Steven Cheng Qian, San Francisco, CA (US); Zheyuan Xie, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 298 days.

(21) Appl. No.: 17/716,974

(22) Filed: Apr. 8, 2022

(51) Int. Cl.
| | |
|---|---|
| G08G 1/00 | (2006.01) |
| B60W 30/06 | (2006.01) |
| G01C 21/34 | (2006.01) |
| G06Q 30/0283 | (2023.01) |
| G07C 1/30 | (2006.01) |
| G08G 1/14 | (2006.01) |

(52) U.S. Cl.
CPC ......... B60W 30/06 (2013.01); G01C 21/3476 (2013.01); G06Q 30/0283 (2013.01); G07C 1/30 (2013.01); G08G 1/147 (2013.01); B60W 2552/05 (2020.02)

(58) Field of Classification Search
None
See application file for complete search history.

(56) References Cited

U.S. PATENT DOCUMENTS

| | | | | |
|---|---|---|---|---|
| 10,699,574 | B1* | 6/2020 | Zeryihun | G08G 1/147 |
| 11,587,193 | B2* | 2/2023 | Liu | H04W 4/029 |
| 2013/0265174 | A1* | 10/2013 | Scofield | G08G 1/146 |
| | | | | 340/932.2 |
| 2020/0175869 | A1* | 6/2020 | Khoo | G08G 1/0141 |
| 2021/0074157 | A1* | 3/2021 | Boutcher-West | G08G 1/015 |
| 2022/0092979 | A1* | 3/2022 | Gambella | G01C 21/3685 |
| 2022/0136855 | A1* | 5/2022 | Higuchi | G08G 1/146 |
| | | | | 701/533 |

* cited by examiner

*Primary Examiner* — James M McPherson
(74) *Attorney, Agent, or Firm* — Lee & Hayes, P.C.

(57) ABSTRACT

Techniques for controlling a vehicle to select parking spaces are discussed herein. The vehicle may receive a request to travel to a destination and obtain information about a first set and a second set of parking spaces within a threshold distance of the destination. The vehicle may determine a first likelihood of availability associated with the first set of parking spaces and a second likelihood of availability associated with the second set of parking spaces. The vehicle may determine a first cost associated with a first route to the first set of parking spaces and a second cost associated with a second route to the second set of parking spaces by the cost function. Upon determining that the first cost is equal to or less than the second cost, the vehicle may navigate based on the first route and park within one of the first set of parking spaces.

20 Claims, 9 Drawing Sheets

FLEET CONTROL FOR PARKING SPACE SELECTION

BACKGROUND

An autonomous vehicle may navigate along designated routes or between waypoints. For example, when a control system receives a request from a user device to pick up a passenger or cargo at a location and provide transport to a destination location, the autonomous vehicle may receive, from the control system, instructions to navigate from the pickup location to the destination location. In some circumstances, the autonomous vehicle may be required to park in order to pick the passenger or cargo up at the pickup location or drop off the passenger or cargo at the destination location. In some instances, such as when the area of the pickup location and/or destination location includes parking spaces, the parking spaces may be unavailable when the autonomous vehicle arrives there.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1A:
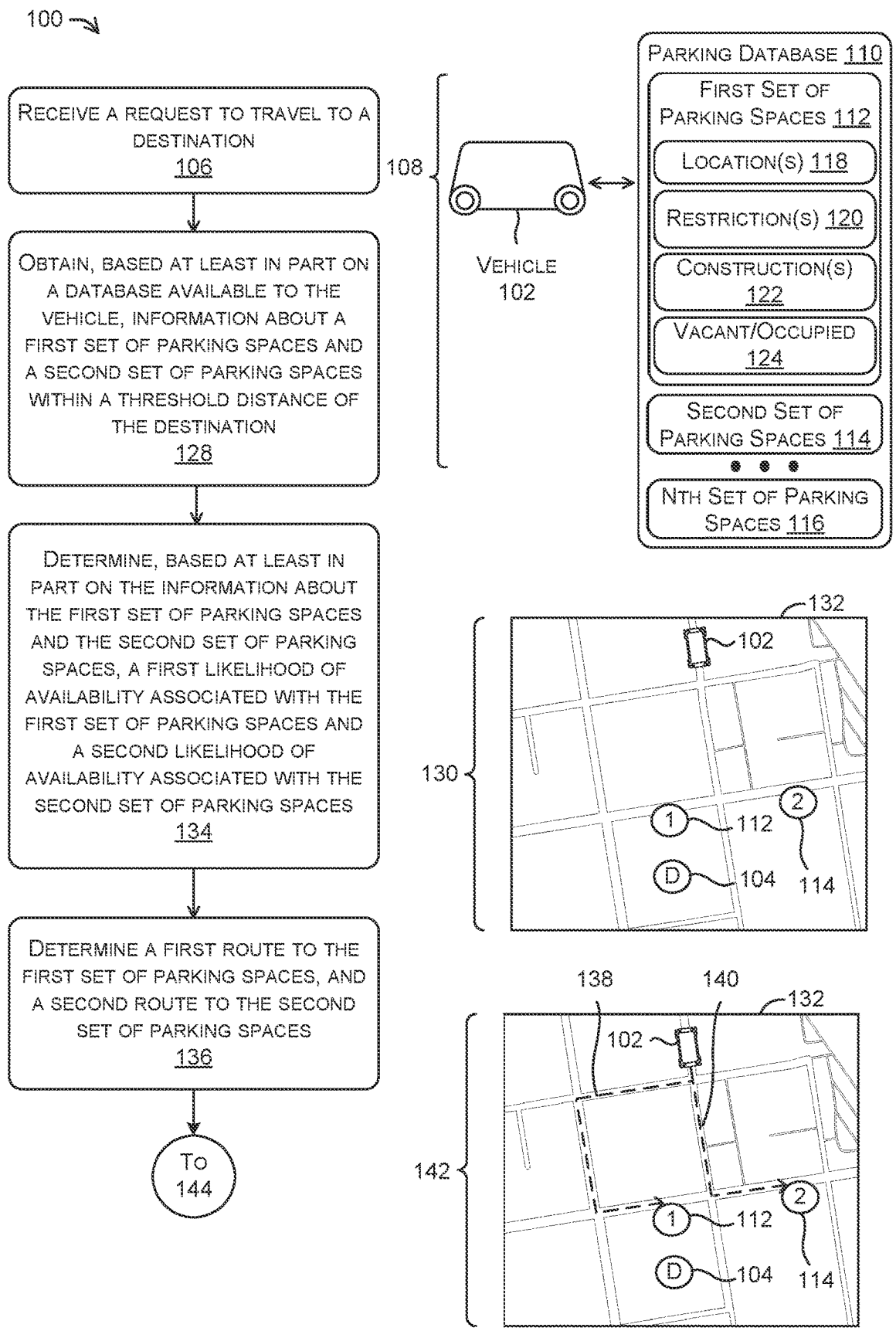
FIG. 1A and FIG. 1B illustrate a pictorial flow diagram of an example process of controlling a vehicle to select parking spaces in order to pick up or drop off a passenger (or cargo) at a destination location.

Techniques for a vehicle to select parking spaces are discussed herein. For example, techniques may include that a vehicle receives a request to travel to a destination, and obtains, based at least in part on a database available to the vehicle, information about first set of parking spaces and a second set of parking spaces within a threshold distance of the destination. As described herein, the vehicle (e.g., an autonomous vehicle) may be included in a fleet of vehicles configured to provide a service. The first set of parking spaces and the second set of parking spaces may be public parking spaces. In some examples, the database may be shared by the vehicles in the fleet. Each of the vehicles in the fleet has access to the database. The database includes map data that indicates the locations of parking spaces in a geographic region. The database may be dynamically updated. For example, a vehicle in the fleet may pass by the geographic region and collect sensor data about parking spaces in the geographic region and use the sensor data to update the database. As another example, a drone may fly over the geographic region and collect sensor data about parking spaces in the geographic region and use the sensor data to update the database. In examples, a monitor for a parking garage or other such structure may provide such information to a vehicle in the form of a list of available spaces (e.g., as detected via an inductive sensor per space) or as an indication of a number of available spaces (provided by counting vehicles entering and/or leaving). As another example, the sensor data about the parking spaces in the geographic region may be collected by a third party and be used to update the database.

The vehicle may determine, based at least in part on the information about the first set of parking spaces and the second set of parking spaces, a first likelihood of availability associated with the first set of parking spaces and a second likelihood of availability associated with the first set of parking spaces. The first/second likelihood of availability associated with the first/second set of parking spaces is for an area (such as a parking lane, a loading zone, a dedicated lane for autonomous vehicle, a street parking zone, a drop-off and pickup area, a parking lot, a garage, and so on) that includes the first/second set of parking spaces. The states (vacant/occupied) and confidences of individual parking spaces included in the first/second set of parking spaces can be components of the first/second likelihood of availability associated with the first/second set of parking spaces. In some examples, the first/second likelihood of availability can be a percentage or other metric indicating how likely the first/second set of parking spaces is available at a particular time such as a current time, a future time, and so on. The first/second likelihood of availability associated with the first/second set of parking spaces may be determined based on a priori probability plus a dynamically updated state.

The priori probability may include a pattern of availability of the first/second set of parking spaces related to a time of a day, a day of a week, and/or a special event. In some examples, the pattern of availability may be established based on accumulated data collected via sensors (such as sensors of vehicles in the fleet, sensors mounted on parking meters, sensors mounted on drones, as so on) over a period reflecting probability distribution of how often the parking space is usually taken. In some examples, the occupancy of the first/second set of parking spaces may be detected by sensors and correlated to time of the day over multiple days to render the pattern of availability of the first/second set of parking spaces. As an example, the pattern of availability of the first/second set of parking spaces may indicate that the first/second set of parking spaces is highly likely (e.g., 90%, 80%, and so on) to be available in the early morning (e.g., between 5 to 8 a.m.), and probably likely (e.g., 60%, 50%, and so on) to be available around noon (e.g., 12 p.m.), and less likely (e.g., 30%, 10%, and so on) to be available in the evening (e.g., between 5 to 7 p. m.). In some examples, the occupancy of the first/second set of parking spaces may be detected by sensors and correlated to the day of the week over multiple weeks to render the pattern of availability of the first/second set of parking spaces. As an example, the pattern of availability of the first/second set of parking spaces may indicate that the first/second set of parking spaces is likely (e.g., 70%, 60%, and so on) to be available on Monday through Friday, and less likely (e.g., 40%, 30%, and so on) to be available on Saturday and Sunday.

Additionally or alternatively, the pattern of availability of the first/second set of parking spaces may be correlated to special events such as an amount of traffic flowing in/out the geographic region with which the first/second set of parking spaces is associated, parking restrictions associated with the first/second set of parking spaces, whether there are ongoing constructions near the first/second set of parking spaces, density of residential properties, density of work properties, and so on.

For example, the higher the amount of traffic flowing in/out the geographic region with which the first/second set of parking spaces is associated, the more likely the first/ second set of parking spaces is available. Because when the amount of traffic flowing in/out of the geographic region is high, more vehicles come into and go out of the geographic region, indicating that vehicles may spend less time at the parking spaces.

For example, parking restrictions can be determined via sensors (such as sensors of vehicles in the fleet, sensors mounted on parking meters, sensors mounted on drones, as so on) by recognizing parking signs (such as "self-parking," "commercial parking," "3-hour limit," "no parking," "reserved parking," "customer parking only," and so on) proximate the first/second set of parking spaces, accessing a government database, inferring for traffic laws, etc. The information regarding the parking restrictions may be stored in the map in the database and correlated with the locations of the first/second set of parking spaces. As an example, the parking restrictions indicates that parking is allowed within a period of time (such as between 8 a.m. and 5 p.m.), and the first/second set of parking spaces are not available when the current time (such as 6 p.m.) is out of the period of time.

For example, ongoing constructions can be determined via sensors (such as sensors of vehicles in the fleet, sensors mounted on parking meters, sensors mounted on drones, as so on) by recognizing constructions signs (such as "detours," "lane closures," "road work," "under construction," orange cones, road barricade, traffic control people on the road, and so on, and so on) proximate the first/second set of parking spaces, etc. For example, when there are ongoing constructions near the first/second set of parking spaces, the first/second set of parking spaces is less likely to be available (such as 10%, 20%, and so on).

The dynamically updated state may include the last (most recent) time points that individual parking spaces of the first/second set of parking spaces are identified as being vacant. As described herein, the first/second likelihood of availability associated with the first/second set of parking spaces is for an area (such as a parking lane, a loading zone, a dedicated lane for autonomous vehicles, a street parking zone, a drop-off and pickup area, a parking lot, a garage, and so on) that includes the first/second set of parking spaces. The states (vacant/occupied) and confidences of individual parking spaces included in the first/second set of parking spaces can be components of the first/second likelihood of availability associated with the first/second set of parking spaces. For example, the longer the time from the detection of vacancy of an individual parking space to the current time, the confidence of the individual parking space is lower, and the first/second likelihood of availability is associated with the first/second set of parking spaces may be lower. In other words, the confidence of the individual parking space decreases over time since the last (most recent) detection of vacancy of the individual parking space. The state of the individual parking space is updated by the vacancy detection, and the confidence of the individual parking space is reset every time the vacancy is detected.

In some examples, the first/second likelihood of availability associated with the first/second set of parking spaces may be determined/calculated by the vehicle. In some examples, the first/second likelihood of availability associated with the first/second set of parking spaces may be determined/calculated by a server which is in communication with the vehicles in the fleet, and the information stored in the database is shared among the vehicles in the fleet.

In example implementations, the vehicle may determine a first route to the first set of parking spaces, and a second route to the second set of parking spaces. The vehicle may determine a first cost associated with the first route by a cost function based on the first likelihood of availability, and a second cost associated with the second route by the cost function based on the second likelihood of availability. As described herein, the first/second likelihood of availability can be the primary input of the cost function to determine the first/second cost associated with the first/second route. Additionally, other factors may be input to the cost function to determine the cost of the route. For example, the cost function may have inputs such as a distance from a current location of the vehicle 102 to the first/second set of parking spaces 112/114, an estimated time from the current location of the vehicle 102 to the first/second set of parking spaces 112/114, the proximity to other parking spaces, real-time or estimated traffic conditions, distance to the destination, and so on. For example, the proximity to other parking spaces may be factored into the cost function because if the vehicle 102 navigates along a route passing by other parking spaces, the vehicle 102 may have a better chance to find parking spaces without having to reroute.

In example implementations, the vehicle may determine whether the first cost associated with the first route is equal to or less than the second cost associated with the second route. Upon determining that the first cost associated with the first route is equal to or less than the second cost associated with the second route, the vehicle may navigate based on the first route, and park within one of the first set of parking spaces.

In some examples, upon determining that the first cost associated with the first route is greater than the second cost associated with the second route, the vehicle may navigate based on the second route, and park within one of the second set of parking spaces.

In example implementations, the first set of parking spaces is within a first distance of the destination, and the second set of parking spaces is outside the first distance and within a second distance of the destination.

In example implementations, the vehicle further comprises a sensor, which is configured to generate sensor data along the first route and/or the second route as the vehicle traverses the first route and/or the second route, and updates the database with the sensor data in real time.

In example implementations, the database comprises, for an individual parking space of the first set of parking spaces: a location of the individual parking space; information about restrictions associated with the individual parking space; an indication that the individual parking space is vacant or occupied; and a timestamp associated with the indication.

The techniques discussed herein may improve the functioning of a computing device, such as a computing device of a vehicle in a number of ways. For example, the vehicles may be controlled in such a way to minimize the time of finding a parking space, as described herein. The techniques described herein may also establish and/or maintain, by intelligently managing the vehicles navigating to parking spaces, efficient service for passengers. Further, by determining an optimal parking space for a vehicle to park, vehicles may spend less time looping around a block to wait for a parking space to be available, resulting in improved efficiency of providing the service, reduced wear on the vehicle (e.g., because of less travel time), and reduced traffic congestion. As a result, a fleet of vehicles may be able to provide the service with an increased level of efficiency.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of available parking spots. Additionally, the techniques described herein may be used with real data (e.g., captured using sensor(s)), simulated data (e.g., generated by a simulator), or any combination of the two.

Figure 1B:
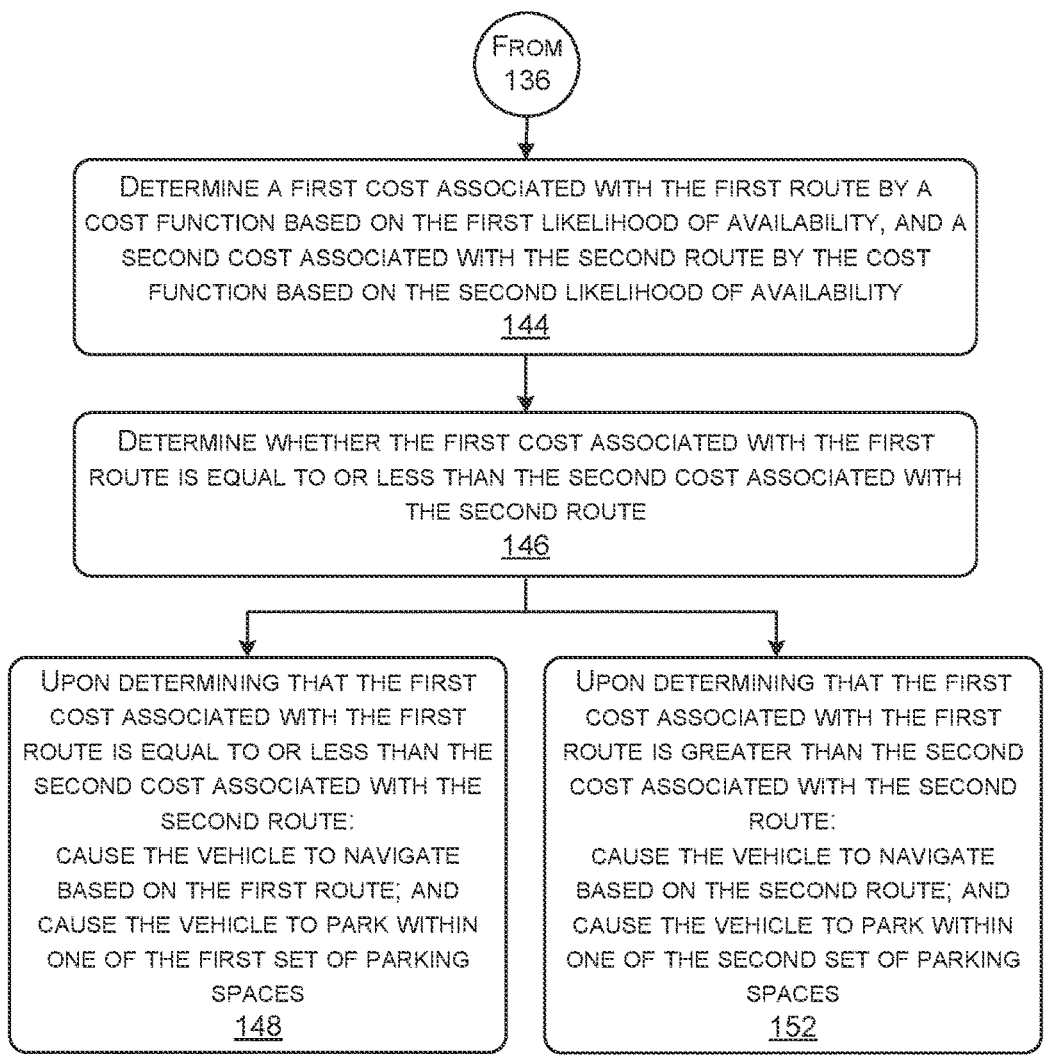
Figure 1B:
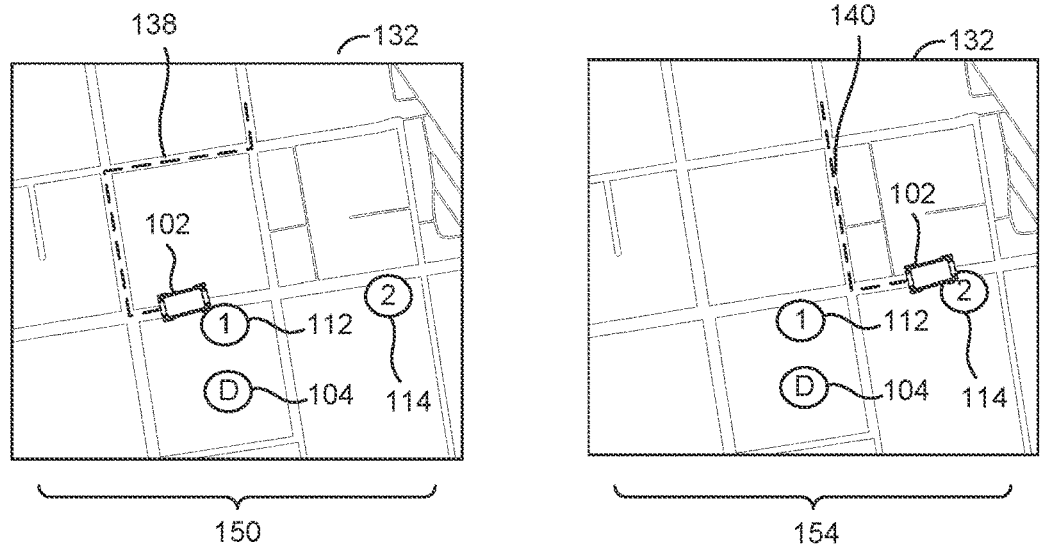

FIG. 1A and FIG. 1B illustrate a pictorial flow diagram of an example process 100 of controlling a vehicle 102 to select parking spaces in order to pick up or drop off a passenger (or cargo) at a destination 104. As described herein, the vehicle 102 may be a vehicle included in a fleet of vehicles configured to provide a service. In some examples, the parking spaces may be located in parking lanes, loading zones, dedicated lanes for autonomous vehicles, street parking zones, drop-off and pickup areas, parking lots, garages, etc.

Referring to FIG. 1A, at operation 106, the process 100 includes receiving a request to travel to a destination 104. For example, the vehicle 102 may receive instructions or requests to traverse to the destination 104 where a passenger or cargo will be picked up or dropped off.

An example 108 accompanying the operation 106 shows an example vehicle 102 in communication with a parking database 110. For example, in response to receiving a request to travel to the destination 104, the vehicle 102 may access the parking database 110 containing information of known parking spaces. In some examples, the database 110 may include a map database which stores graphic data demarking parking spaces and whether the parking spaces are available. Additionally or alternatively, the database may include a text-based database which maintains a text collection. Additionally or alternatively, the database may be a combination of a text-based database and a map database.

As described herein, the parking database 110 may be shared by the vehicles in the fleet. Each of the vehicles in the fleet has access to the parking database 110 and can retrieve/upload data from/to the parking database 110. The parking database 110 includes data associated with one or more first set of parking spaces 112, a second set of parking spaces 114, . . . and an nth set of parking spaces 116, where n is a positive integer. The parking database 110 includes map data associated with a geographic region that indicates the location(s) 118 of the first set of parking spaces 112, data related to parking restrictions 120 associated with the first set of parking spaces 112, data related to ongoing constructions 122 near the first set of parking spaces 112 and/or other activities that may impact the availability of the first set of parking spaces 112, data related to whether individual parking spaces of the first set of parking spaces 112 are vacant or occupied 124 and a timestamp of the data updated. For example, an individual parking space of the first set of parking spaces 112 is vacant when no other objects are located within the individual parking space. As described herein, an object may include, but is not limited to, a vehicle, a person, a bike, a sign, and/or any other types of objects.

In some examples, the parking database 110 may be dynamically updated. In some examples, the parking database 110 may be dynamically updated with sensor data collected by the vehicles in the fleet, sensor data collected by a drone, data provided by a third party, any combination thereof, and so on. Additional details regarding how to detect parking spaces can be found in U.S. Patent Publication No. 2021-0096565A1, titled "Parking Zone Detection for Vehicles," filed on Sep. 30, 2019, which is incorporated by reference herein in its entirety for all purposes. Techniques regarding a vehicle identifying a parking zone and then analyzing the parking zone in order to identify one or more portions of the parking zone that are available for parking the vehicle are described therein. Here, the parking spaces stored in the parking database 110 may be detected using techniques described in the application "Parking Zone Detection for Vehicles."

In some examples, the parking database 110 may include data from a third party that provides parking information of the geographic region. For example, the third party may have a smart parking system monitoring a parking network, where parking meters are equipped with sensors that can detect whether a parking space is occupied or not. Thus, the third party's smart parking system can monitor the real-time parking availability across the geographic region. Without limitation, the third party may be associated with a municipality. In some examples, the parking database 110 may include bird's eye view images/videos of the geographic region taken by aerial photography instruments such as drones and so on. For example, the bird's eye view images/videos of the geographic region may be used to determine the states of parking spaces, e.g., in real time or near real time, such as whether the parking spaces are occupied or vacant.

At operation 128, the process 100 includes obtaining, based at least in part on a database available to the vehicle 102, information of a first set of parking spaces 112 and a second set of parking spaces 114 within a threshold distance of the destination 104. In some examples, the first set of parking spaces 112 and the second set of parking spaces 114 are public parking spaces. In some examples, the threshold distance may be set and/or adjusted arbitrarily. For example, the threshold distance may be 100 feet, 0.5 miles, and so on, of the destination 206.

An example 130 accompanying the operation 128 shows a portion of the geographic region 132, the vehicle 102, the destination 104, and the first set of parking spaces 112, and the second set of parking spaces 114. In some examples, the first set of parking spaces 112 may be within a first distance of the destination 104. For example, the first set of parking spaces 112 is within the same block as the destination 104. As another example, the first set of parking spaces is within 100 feet, 0.5 miles, and so on, of the destination 104. In some examples, the second set of parking spaces 114 may be outside the first distance and within a second distance of the destination 104. For example, the second set of parking spaces 114 is one block away from the destination 104. For example, the second set of parking spaces 114 is within 200 feet, 1 mile, and so on, from the destination 104. The second distance may be greater than the first distance, and both the first distance and the second distance are within the threshold distance. In case that the vehicle is dropping off the passenger at the destination 104, and the first set of parking spaces 112 which is more proximate to the destination 104 is not likely to be available, the vehicle 102 may request permission from the passenger to go to the second set of parking spaces 114 such that the vehicle 102 may drop off the passenger at the second set of parking spaces 114. In case that the vehicle 102 is picking up the passenger at the destination 104, and the first set of parking spaces 112 which is more proximate to the destination 104 is not likely to be available, the vehicle 102 may communicate with the passenger to request the passenger to walk a certain distance from the destination 104 to the second set of parking spaces 114 such that the vehicle 102 may pick up the passenger at the second set of parking spaces 114.

At operation 134, the process 100 includes determining, based at least in part on based at least in part on the information about the first set of parking spaces 112 and the second set of parking spaces 114, a first likelihood of availability associated with the first set of parking spaces 112 and a second likelihood of availability associated with the second set of parking spaces 114. The first/second likelihood of availability associated with the first/second set of parking spaces 112/114 is for an area (such as a parking lane, a loading zone, a dedicated lane for autonomous vehicle, a street parking zone, a drop-off and pickup area, a parking lot, a garage, and so on) that includes the first/second set of parking spaces 112/114. The states (vacant/occupied) and confidences of individual parking spaces included in the first/second set of parking spaces 112/114 can be components of the first/second likelihood of availability associated with the first/second set of parking spaces 112/114. In some examples, the first/second likelihood of availability can be a percentage or other metric indicating how likely the first/second set of parking spaces 112/114 is available at a particular time such as a current time, a future time, and so on. The first/second likelihood of availability associated with the first/second set of parking spaces 112/114 may be determined based on a priori probability plus a dynamically updated state.

The priori probability may include a pattern of availability of the first/second set of parking spaces 112/114 related to a time of a day, a day of a week, and/or a special event. In some examples, the pattern of availability may be established based on accumulated data collected via sensors (such as sensors of vehicles in the fleet, sensors mounted on parking meters, sensors mounted on drones, as so on) over a period reflecting probability distribution of how often the parking space is usually taken. In some examples, the occupancy of the first/second set of parking spaces 112/114 may be detected by sensors and correlated to time of the day over multiple days to render the pattern of availability of the first/second set of parking spaces 112/114. As an example, the pattern of availability of the first/second set of parking spaces 112/114 may indicate that the first/second set of parking spaces 112/114 is highly likely (e.g., 90%, 80%, and so on) to be available in the early morning (e.g., between 5 to 8 a.m.), and probably likely (e.g., 60%, 50%, and so on) to be available around noon (e.g., 12 p.m.), and less likely (e.g., 30%, 10%, and so on) to be available in the evening (e.g., between 5 to 7 p. m.). In some examples, the occupancy of the first/second set of parking spaces 112/114 may be detected by sensors and correlated to the day of the week over multiple weeks to render the pattern of availability of the first/second set of parking spaces 112/114. As an example, the pattern of availability of the first/second set of parking spaces 112/114 may indicate that the first/second set of parking spaces 112/114 is likely (e.g., 70%, 60%, and so on) to be available on Monday through Friday, and less likely (e.g., 40%, 30%, and so on) to be available on Saturday and Sunday.

Additionally or alternatively, the pattern of availability of the first/second set of parking spaces 112/114 may be correlated to special events such as an amount of traffic flowing in/out the geographic region with which the first/second set of parking spaces 112/114 associated, parking restrictions associated with the first/second set of parking spaces 112/114, whether there are ongoing constructions near the first/second set of parking spaces 112/114, density of residential properties, density of work properties, and so on.

For example, the higher the amount of traffic flowing in/out the geographic region with which the first/second set of parking spaces 112/114 is associated, the more likely the first/second set of parking spaces 112/114 is available. Because when the amount of traffic flowing in/out of the geographic region is high, more vehicles come into and go out of the geographic region, indicating that vehicles may spend less time at the parking spaces.

For example, parking restrictions can be determined via sensors (such as sensors of vehicles in the fleet, sensors mounted on parking meters, sensors mounted on drones, as so on) by recognizing parking signs (such as "self-parking," "commercial parking," "3-hour limit," "no parking," "reserved parking," "customer parking only," and so on) proximate the first/second set of parking spaces 112/114, accessing a government database 110, inferring for traffic laws, etc. The information regarding the parking restrictions may be stored in the map in the database 110 and correlated with the locations of the first/second set of parking spaces 112/114. As an example, the parking restrictions indicates that parking is allowed within a period of time (e.g., between 8 a.m. and 5 p.m.), and the first/second set of parking spaces 112/114 is not available when the current time (e.g., 6 p.m.) is out of the period of time.

For example, ongoing constructions can be determined via sensors (such as sensors of vehicles in the fleet, sensors mounted on parking meters, sensors mounted on drones, as so on) by recognizing constructions signs (such as "detours," "lane closures," "road work," "under construction," orange cones, road barricade, traffic control people on the road, and so on, and so on) proximate the first/second set of parking spaces 112/114, etc. For example, when there are ongoing constructions near the first/second set of parking spaces 112/114, the first/second set of parking spaces 112/114 is less likely to be available (such as 10%, 20%, and so on).

The dynamically updated state may include the last (most recent) time points that individual parking spaces of the first/second set of parking spaces 112/114 are identified as being vacant. As described herein, the first/second likelihood of availability associated with the first/second set of parking spaces 112/114 is for an area (such as a parking lane, a loading zone, a dedicated lane for autonomous vehicle, a street parking zone, a drop-off and pickup area, a parking lot, a garage, and so on) that includes the first/second set of parking spaces 112/114. The states (vacant/occupied) and confidences of individual parking spaces included in the first/second set of parking spaces 112/114 can be components of the first/second likelihood of availability associated with the first/second set of parking spaces 112/114. For example, the longer the time from the detection of vacancy of an individual parking space to the current time, the confidence of the individual parking space is lower, and the first/second likelihood of availability associated with the first/second set of parking spaces 112/114 may be lower. In other words, the confidence of the individual parking space decreases over time since the last (most recent) detection of vacancy of the individual parking space. The state of the individual parking space is updated by the vacancy detection, and the confidence of the individual parking space is reset every time the vacancy is detected.

In some examples, the first/second likelihood of availability associated with the first/second set of parking spaces 112/114 may be determined/calculated by the vehicle. In some examples, the first/second likelihood of availability associated with the first/second set of parking spaces 112/114 may be determined/calculated by a server which is in communication with the vehicles in the fleet, and the information stored in the database 110 is shared among the vehicles in the fleet.

At operation 136, the process 100 may include determining a first route 138 to the first set of parking spaces 112 and a second route 140 to the second set of parking spaces 114. An example 142 accompanying the operation 136 shows a portion of an example geographic region 132, the vehicle 102, the destination 104, the first set of parking spaces 112, the second set of parking spaces, the first route 138, and the second route 140. In some examples, although not illustrated, one or more additional parking spaces may be included in the geographic region 136. In at least some examples, the first/second route 132/140 may be determined as a route that best positions the vehicle 102 for parking in the first/second set of parking spaces 112/114. For instance, the first/second route 138/140 may position the vehicle 102 on the side of the road adjacent to the first/second set of parking spaces 112/114.

Referring to FIG. 1B, at operation 144, the process 100 includes determining a first cost associated with the first route 112 by a cost function based on the first likelihood of availability, and a second cost associated with the second route 114 by the cost function based on the second likelihood of availability. As described herein, the first/second likelihood of availability is the primary input of the cost function to determine the first/second cost associated with the first/second route. Additionally, other factors may be input to the cost function to determine the cost of the route. For example, the cost function may have inputs such as a distance from a current location of the vehicle 102 to the first/second set of parking spaces 112/114, an estimated time from the current location of the vehicle 102 to the first/second set of parking spaces 112/114, the proximity to other parking spaces, and so on. For example, the proximity to other parking spaces may be factored into the cost function because if the vehicle 102 navigates along a route passing by other parking spaces, the vehicle 102 may have a better chance to find parking spaces without having to reroute.

At operation 146, the process 100 includes determining whether the first cost associated with the first route 138 is equal to or less than the second cost associated with the second route 140. For example, the vehicle 102 may determine a route with the lowest cost within the threshold distance of the destination 104 by comparing costs of different routes.

At operation 148, the process 100 includes upon determining that the first cost associated with the first route 138 is equal to or less than the second cost associated with the second route 140: causing the vehicle 102 to navigate based on the first route 138; and causing the vehicle 102 to park within one of the first set of parking spaces 114. An example 150 accompanying the operation 148 shows the vehicle 102 is controlled to navigate the geographic region 132 generally along a path corresponding to the first route 138 and park within one of the first set of parking spaces 114.

In addition to navigating to the first set of parking spaces 114, the vehicle 102 may also generate data, e.g., sensor data, perception data, and/or the like, as the vehicle traverses the first route 138 and update the parking database 110 with the data in real time. In addition to parking within one of the first set of parking spaces 112, the vehicle 102 may also send an instruction to update the parking database 110, e.g., to indicate that one of the first set of parking spaces 112 is now occupied.

At operation 152, the process 100 includes upon determining that the first cost associated with the first route 138 is greater than the second cost associated with the second route 140: causing the vehicle 102 to navigate based on the second route 140; and causing the vehicle 102 to park within one of the second set of parking spaces 114. An example 154 accompanying the operation 152 shows the vehicle 102 is controlled to navigate the geographic region 132 generally along a path corresponding to the second route 140 and park within one of the second set of parking spaces 114.

In addition to navigating to the second set of parking spaces 114, the vehicle 102 may also generate data, e.g., sensor data, perception data, and/or the like, as the vehicle traverses the second route 140 and update the parking database 110 with the data in real time. In addition to parking within one of the second set of parking spaces 114, the vehicle 102 may also send an instruction to update the parking database 110, e.g., to indicate that one of the second set of parking spaces 114 is now occupied.

In some examples, the first set of parking spaces 112 and/or the second set of parking spaces 114 may be occupied by other vehicles in the fleet. Since the vehicles in the fleet share the same parking database 110, other vehicles in the fleet may have the information that vehicle 102 is coming to the first set of parking spaces 112 and/or the second set of parking spaces 114. Thus, instead of immediately leaving, another vehicle in the fleet may hold an individual parking space of the first set of parking spaces 112 and/or the second set of parking spaces 114 for the vehicle 102 for a period of time such as 5 minutes, 10 minutes, and so on, such that the vehicle 102 may have time to navigate to the first set of parking spaces 112 and/or the second set of parking spaces 114 to park.

FIG. 2A, FIG. 2B, FIG. 2C, and FIG. 2D depict an example portion of a geographic region 200 as described herein. The geographic region 200 includes a first set of parking spaces 202(1), a second set of parking spaces 202(2), an nth set of parking spaces 202(n), a first vehicle 204(1), a second vehicle 204(2), and an nth vehicle 204(n) configured for providing a service, where n is a positive integer. The service may include picking up a passenger or cargo at a first location and providing transport to a second location to drop off the passenger or cargo. In some examples, the sets of parking spaces 202(1)-202(n) may locate in parking lanes, loading zones, dedicated lanes for autonomous vehicles, street parking zones, drop-off and pickup areas, parking lots, garages, etc.

As described herein, a database may be shared by the vehicles 204(1)-204(n) in the fleet. Although the example illustration in FIG. 2 depicts three vehicles in the fleet and three sets of parking spaces associated with the geographic region 200, the fleet of vehicles may include any number of vehicles, and/or the geographic region 200 may have any number of sets of parking spaces. Each of the vehicles 204(1)-204(n) in the fleet has access to the database and can retrieve/upload data from/to the database. The database includes data associated with the first set of parking spaces 202(1), the second set of parking spaces 202(2), . . . and the nth set of parking spaces 202(n). The database may correspond to the parking database 110 described with reference to FIG. 1A and FIG. 1B.

In some examples, the database may be dynamically updated. In some examples, the database may be dynamically updated with data collected by the vehicles 204(1)-204(n) in the fleet. For example, each of the vehicles 204(1)-204(n) may be equipped with one or more sensors to perceive the environment in which they are operating. Moreover, the vehicles 204(1)-204(n) may include computing systems that utilize the sensor data, e.g., to localize the vehicles 204(1)-204(n) in the environment, to perceive objects in the environment, and/or to plan trajectories relative to such objects. In some examples, each of the vehicles 204(1)-204(n) in the fleet, using the sensor data and/or the computing system outputs, may be able to detect the states (occupied/vacant) of the sets of parking spaces 202(1)-202(n). The vehicles 204(1)-204(n) may send the detected states of the sets of parking spaces 202(1)-202(n) to the database in real-time, periodically (such as every 10 seconds, every minute, every hour, and so on), and/or upon request. For example, a first vehicle 204(1) of the fleet may pass by the first set of parking spaces 202(1) and detect the state of the first set of parking spaces 202(1). The first vehicle 204(1) may send first data that represents the state of the first set of parking spaces 202(1) and the time of the state to the database.

Additional details regarding how to detect parking spaces can be found in U.S. Patent Publication No. 2021-0096565A1, titled "Parking Zone Detection for Vehicles," filed on Sep. 30, 2019, which is incorporated by reference herein in its entirety. Techniques regarding a vehicle identifying a parking zone and then analyzing the parking zone in order to identify one or more portions of the parking zone that are available for parking the vehicle are described therein. Here, the information of the sets of parking spaces 202(1)-202(n) stored in the database may be determined using techniques described in the application "Parking Zone Detection for Vehicles."

In example implementations, the vehicles 204(1)-204(n) in the fleet that share the database may optimize where to park based on the information associated with the sets of parking spaces 202(1)-202(n) from the database. For example, if a second vehicle 204(2) in the fleet is going to pick up or drop off a passenger or cargo at a busy area within the geographic region 200, and the information stored in the database shows that all parking spaces around that area are likely to be full/occupied, the second vehicle 204(2) can make the prediction ahead of time and reroute to a different location where another parking space is likely to be vacant and pick up or drop off the passenger or cargo there. Additionally, the second vehicle 240(2) can optimize rerouting when having the knowledge of where to reroute as opposed to just looping around the destination and hoping to find a vacant parking space.

For example, the second vehicle 204(2) may receive a request to travel to a destination 206. The second vehicle 204(2) may obtain, based at least in part on the database available to the vehicle 204(2), information about the first set of parking spaces 202(1) and the second set of parking spaces 202(2) within a threshold distance of the destination 206. In some examples, the threshold distance may be set and/or adjusted arbitrarily. For example, the threshold distance may be 100 feet, 0.5 miles, and so on, of the destination 206.

In some examples, the first set of parking spaces 202(1) may be within a first distance of the destination 206. For example, the first set of parking spaces 202(1) is within the same block as the destination 206. As another example, the first set of parking spaces 202(1) is within 100 feet, 0.5 miles, and so on, of the destination 206. In some examples, the second set of parking spaces 202(2) may be outside the first distance and within a second distance of the destination 206. For example, the second set of parking spaces 202(2) is one block away from the destination 206. For example, the second parking space 130 is within 200 feet, 1 mile, and so on, from the destination 206. The second distance may be greater than the first distance, and both the first distance and the second distance are within the threshold distance. In case that the second vehicle 202(2) is dropping off the passenger at the destination 206, and the first set of parking spaces 202(1) which is more proximate to the destination 206 is not likely to be available, the second vehicle 204(2) may request permission from the passenger to go to the second set of parking spaces 202(2) such that the second vehicle 204(2) may drop off the passenger at the second set of parking spaces 202(2). In case that the vehicle is picking up the passenger at the destination, and the first set of parking spaces which is more proximate to the destination is not likely to be available, the vehicle may communicate with the passenger to request the passenger to walk a certain distance from the destination 206 to the second set of parking spaces 202(2) such that the second vehicle 204(2) may pick up the passenger at the second set of parking spaces 202(2).

The second vehicle 204(2) may determine, based at least in part on the information about the first set of parking spaces 202(1) and the second set of parking spaces 202(2) stored in the database, a first likelihood of availability associated with the first set of parking spaces 202(1) and a second likelihood of availability associated with the second set of parking spaces 202(2). Additional details regarding how to determine the first/second likelihood of availability associated with the first/second set of parking spaces 202(1)/202(2) are described throughout this disclosure such as with reference to FIG. 1A and FIG. 1B, where the first set of parking spaces 202(1) corresponds to the first set of parking spaces 112, and the second set of parking spaces 202(2) corresponds to the second set of parking spaces 114.

Figure 2A:
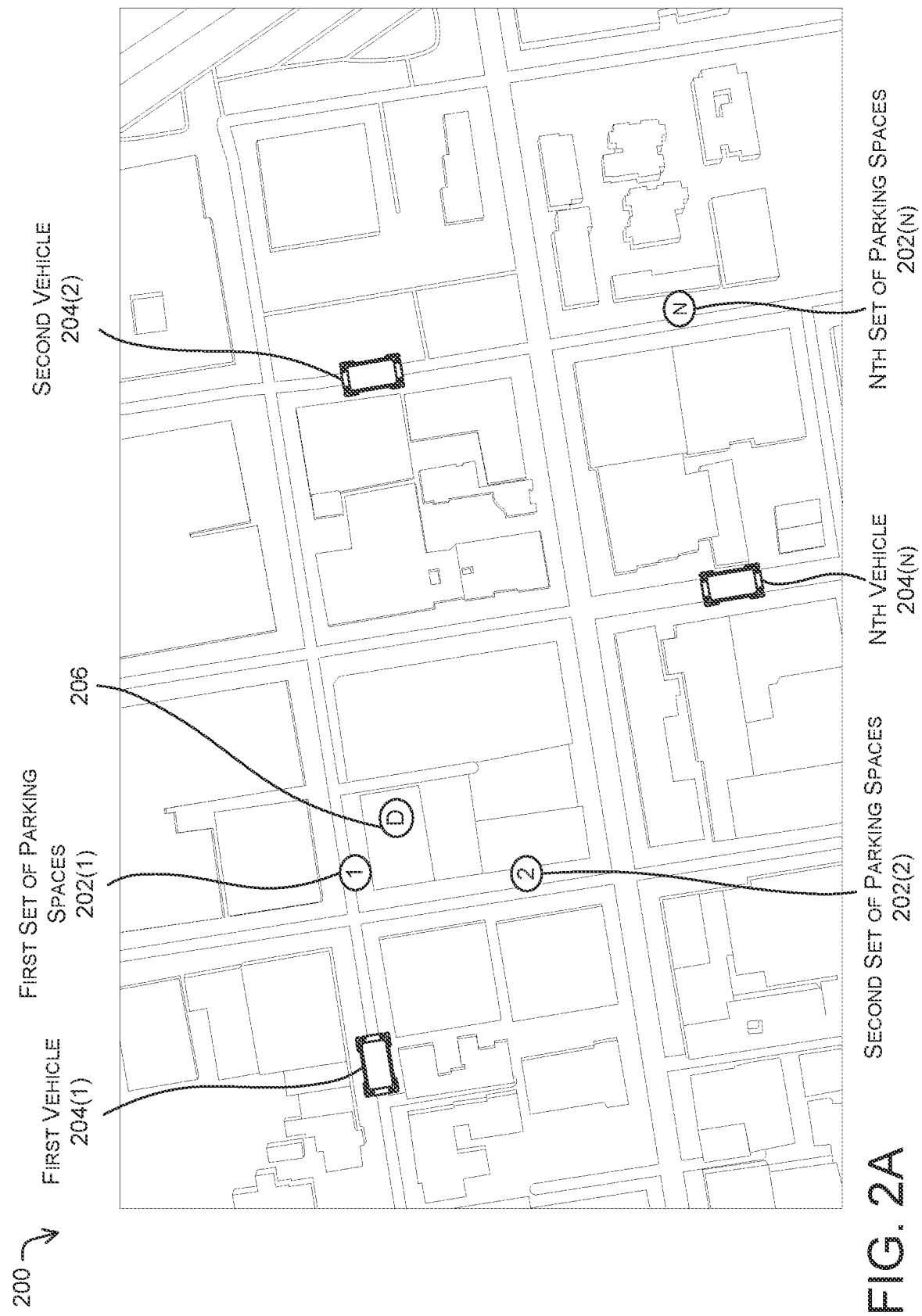
FIG. 2A, FIG. 2B, FIG. 2C, and FIG. 2D depict an example portion of a geographic region as described herein.
Figure 2B:
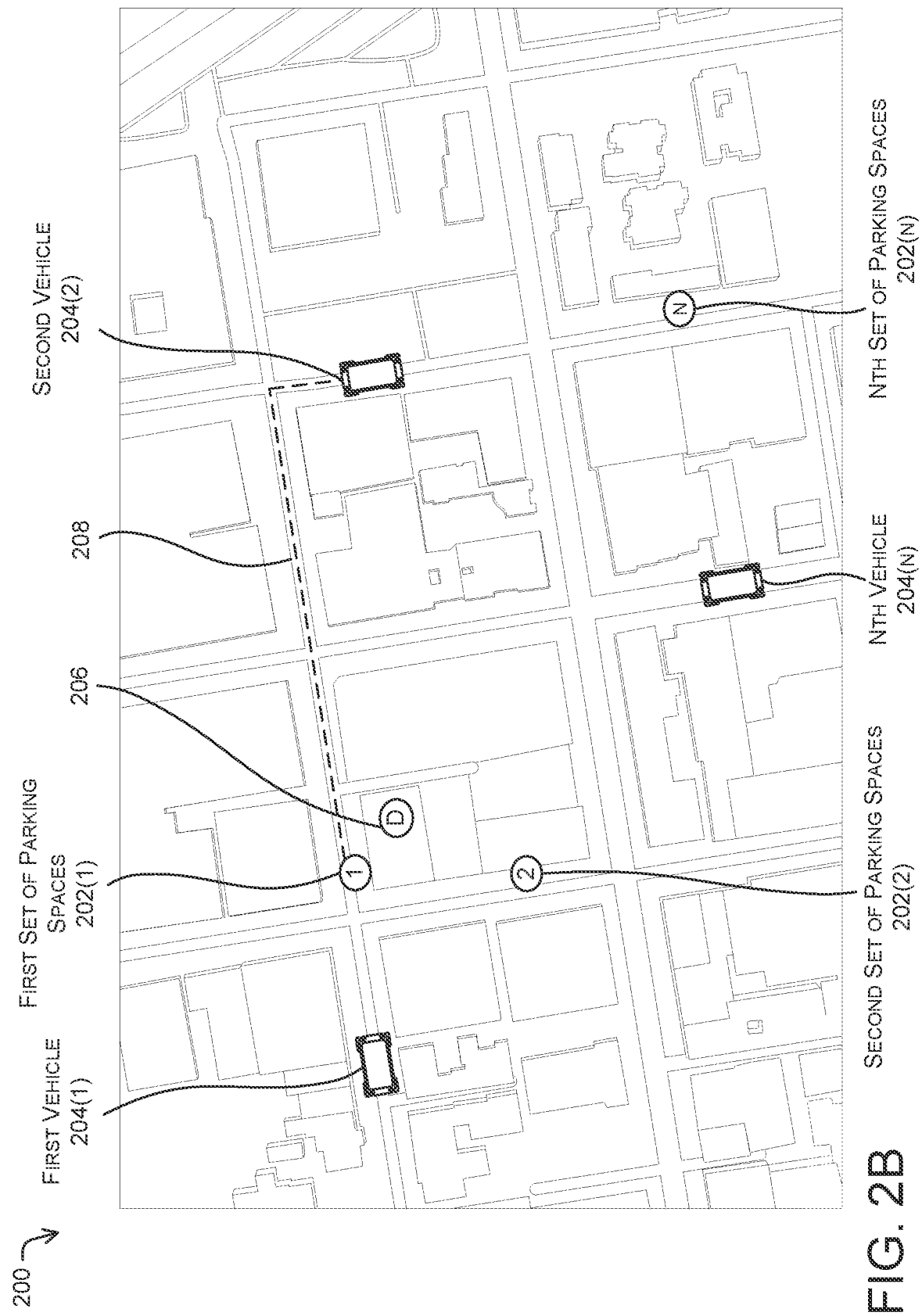
Figure 2C:
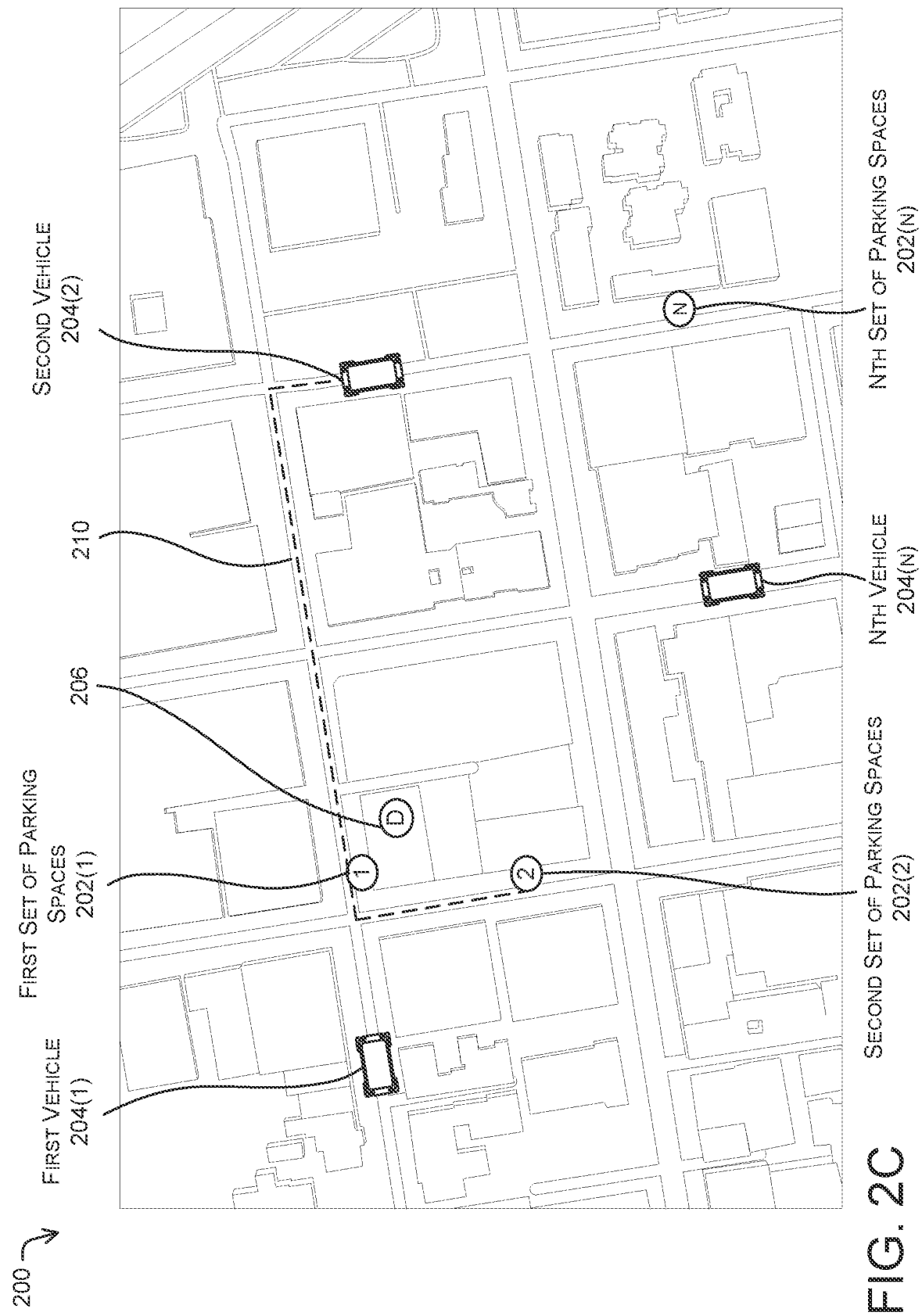

Referring to FIG. 2B and FIG. 2C, the second vehicle 240(2) may determine a first route 208 to the first set of parking spaces 202(1) and a second route 210 to the second set of parking spaces 202(2). The second vehicle 240(2) may determine a first cost associated with the first route 208 by a cost function based on the first likelihood of availability, and a second cost associated with the second route 210 by the cost function based on the second likelihood of availability. As described herein, the first/second likelihood of availability is the primary input of the cost function to determine the first/second cost associated with the first/second route 208/210. Additionally, other factors may be input to the cost function to determine the cost of the route. For example, the cost function may have inputs such as a distance from a current location of the vehicle second vehicle 240(2) to the first/second set of parking spaces 202(1)/202(2), an estimated time from the current location of the second vehicle 240(2) to the first/second set of parking spaces 202(1)/202(2), the proximity to other parking spaces, and so on. For example, the proximity to other parking spaces may be factored into the cost function because if the second vehicle 240(2) navigates along a route passing by other parking spaces, the second vehicle 240(2) may have a better chance to find parking spaces without having to reroute.

The second vehicle 240(2) may determine whether the first cost associated with the first route 208 is equal to or less than the second cost associated with the second route 210. For example, the second vehicle 240(2) may determine a route with the lowest cost within the threshold distance of the destination 206.

Referring to FIG. 2B, upon determining that the first cost associated with the first route 208 is equal to or less than the second cost associated with the second route 210, the second vehicle 240(2) may navigate based on the first route 108 and park within one of the first set of parking spaces 202(1). For instance, the first route 208 may position the second vehicle 240(2) on the side of the road adjacent to the first set of parking spaces 202(1).

In addition to navigating to the first set of parking spaces 202(1), the second vehicle 240(2) may also generate data, e.g., sensor data, perception data, and/or the like, as the vehicle traverses the first route 108 and update the database with the data in real time. In addition to parking within one of the first set of parking spaces 202(1), the second vehicle 240(2) may also send an instruction to update the database, e.g., to indicate that one of the first set of parking spaces 202(1) is now occupied.

Referring to FIG. 2C, upon determining that the first cost associated with the first route 108 is greater than the second cost associated with the second 210, the second vehicle 240(2) may navigate based on the second route 210 and park within one of the second set of parking spaces 202(2). For instance, the second route 210 may position the second vehicle 240(2) on the side of the road adjacent to the second set of parking spaces 202(2).

In addition to navigating to the second set of parking spaces 202(2), the second vehicle 240(2) may also generate data, e.g., sensor data, perception data, and/or the like, as second vehicle 240(2) traverses the second route 210 and update the database with the data in real time. In addition to parking within one of the second set of parking spaces 202(2), the second vehicle 240(2) may also send an instruction to update the database, e.g., to indicate that one of the second set of parking spaces 202(2) is now occupied.

Figure 2D:
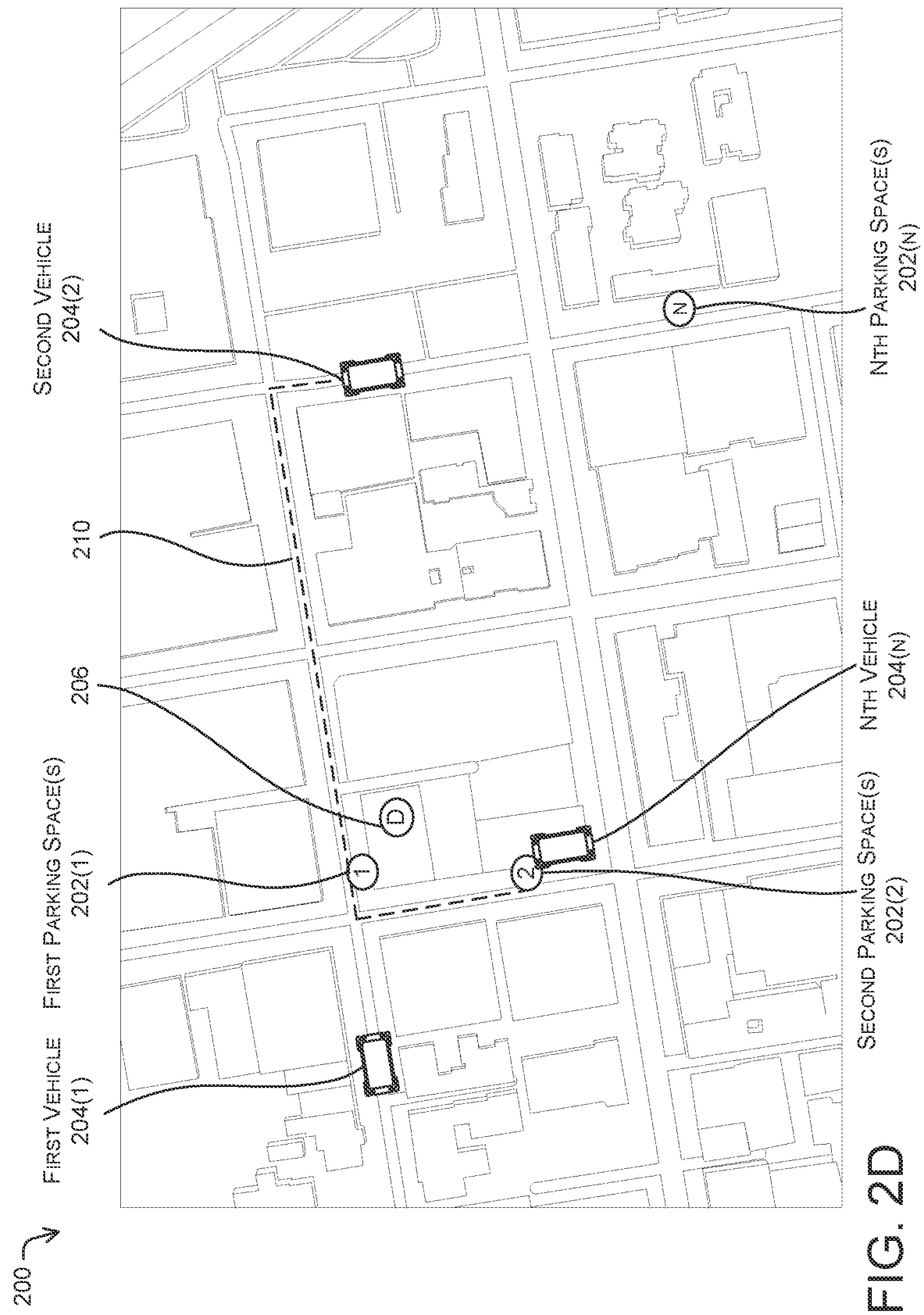

Referring to FIG. 2D, in some examples, an individual parking space of the second set of parking spaces 202(2) may be occupied by the nth vehicle 204(n) in the fleet. Since the vehicles in the fleet share the same database, other vehicles in the fleet may have the information that the second vehicle 204(2) is coming to the second set of parking spaces 202(2). Thus, instead of immediately leaving, the nth vehicle 204(n) may hold the individual parking space of the second set of parking spaces 202(2) for the second vehicle 204(2) for a period of time such as 5 minutes, 10 minutes, and so on, such that the second vehicle 204(2) may have time to navigate to the second set of parking spaces 202(2) to park.

Figure 3A:
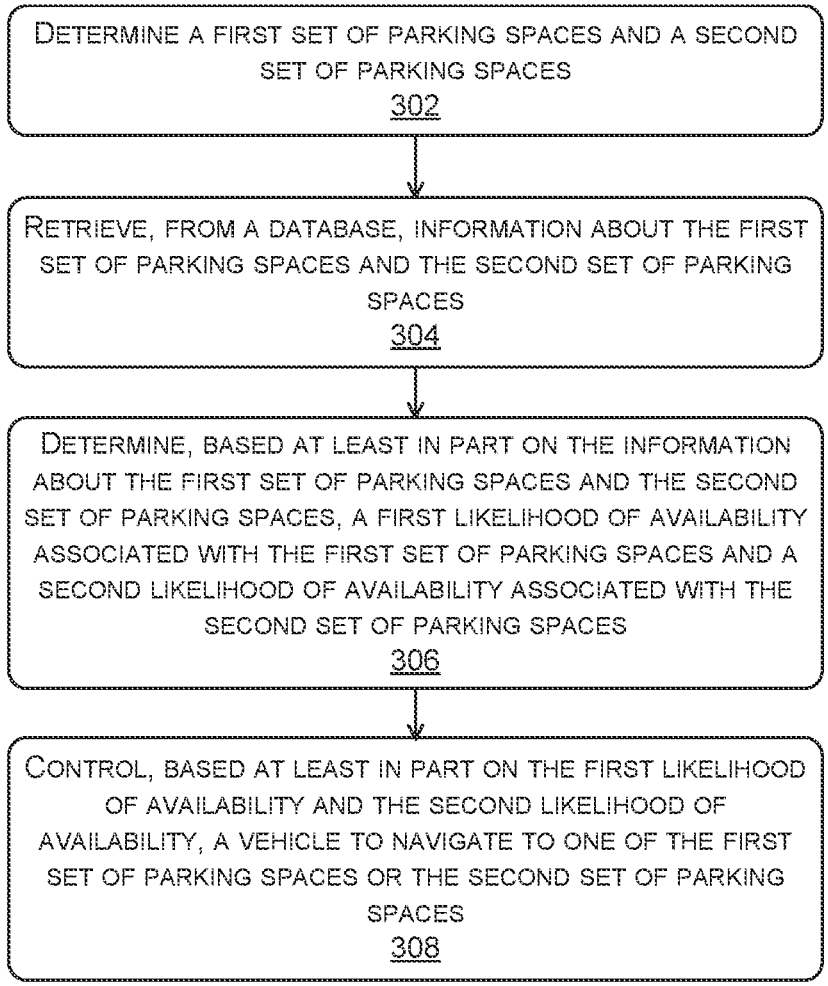
FIG. 3A and FIG. 3B illustrate an example process for controlling a vehicle to select parking spaces.
Figure 3B:
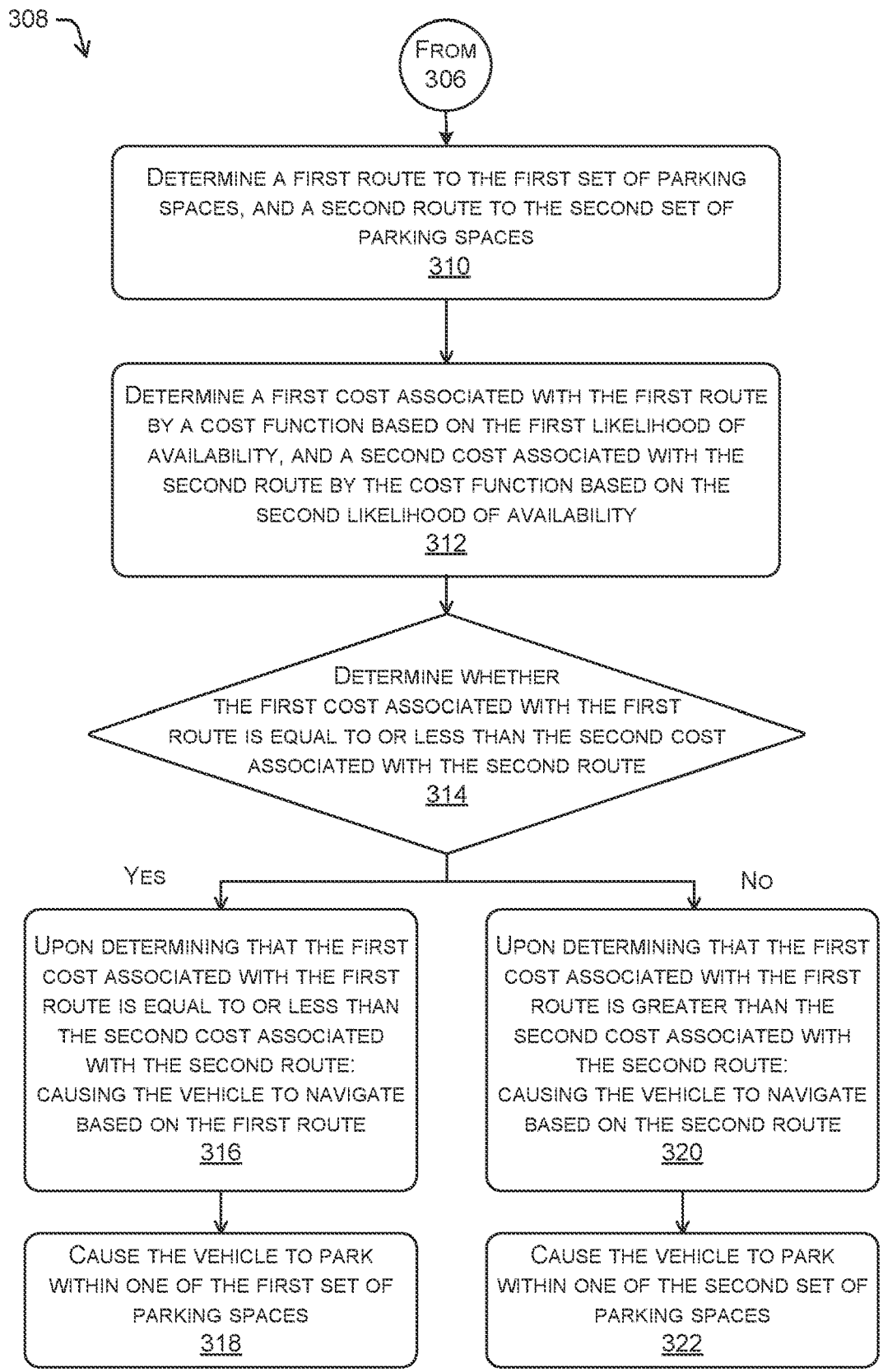

FIG. 3A and FIG. 3B illustrate an example process 300 for controlling a vehicle to select parking spaces. As described herein, the vehicle may be a vehicle included in a fleet of vehicles configured to provide a service. In some examples, the parking spaces may be located in parking lanes, loading zones, dedicated lanes for autonomous vehicles, street parking zones, drop-off and pickup areas, parking lots, garages, etc. In some examples, the vehicle may correspond to the vehicle 102 described with reference to FIGS. 1A and 1B and/or the vehicles 204(1)-204(n) described with reference to FIGS. 2A-2D. For example, some or all of the process 300 may be performed by one or more components in FIG. 4, as described herein. In some examples, some or all of the process 300 may be performed by the computing device(s) 406, the sensor system(s) 408, the communication connection(s) 412, the drive system(s) 416, and/or the vehicle 402.

Referring to FIG. 3A, at operation 302, the process 300 may include determining a first set of parking spaces and a second set of parking spaces. For example, the vehicle may receive instructions or requests to traverse to a destination where a passenger or cargo will be picked up or dropped off. The vehicle may obtain based at least in part on a database available to the vehicle, information of a first set of parking spaces and a second set of parking spaces within a threshold distance of the destination. In some examples, the first set of parking spaces 112 and the second set of parking spaces 114 are public parking spaces. In some examples, the threshold distance may be set and/or adjusted arbitrarily. For example, the threshold distance may be 100 feet, 0.5 miles, and so on, of the destination.

In some examples, the first set of parking spaces may correspond to the first set of parking spaces 112 described with reference to FIGS. 1A and 1B and/or the first set of parking spaces 202(1) described with reference to FIGS. 2A-2D. Additional details regarding the database are described throughout this disclosure such as with reference to FIGS. 1A, 1B, and 2A-2D.

At operation 304, the process 300 may include retrieving, from a database, information about the first set of parking spaces and the second set of parking spaces. In some examples, the first set of parking spaces may be within a first distance of the destination. For example, the first set of parking spaces is within the same block as the destination. As another example, the first set of parking spaces is within 100 feet, 0.5 miles, and so on, of the destination. In some examples, the second set of parking spaces may be outside the first distance and within a second distance of the destination. For example, the second set of parking spaces is one block away from the destination. For example, the second parking space is within 200 feet, 1 mile, and so on, from the destination. The second distance may be greater than the first distance, and both the first distance and the second distance are within the threshold distance. In case that the vehicle is dropping off the passenger at the destination, and the first set of parking spaces which is more proximate to the destination is not likely to be available, the vehicle may request permission from the passenger to go to the second set of parking spaces such that the vehicle may drop off the passenger at the second set of parking spaces. In case that the vehicle is picking up the passenger at the destination, and the first set of parking spaces which is more proximate to the destination is not likely to be available, the vehicle may communicate with the passenger to request the passenger to walk a certain distance from the destination to the second set of parking spaces such that the vehicle may pick up the passenger at the second set of parking spaces.

At operation 306, the process 300 may include determining, based at least in part on the information about the first set of parking spaces stored in the database, a first likelihood of availability associated with the first set of parking spaces and a second likelihood of availability associated with the second set of parking spaces. Additional details regarding how to determine the first/second likelihood of availability associated with the first/second set of parking spaces are described throughout this disclosure such as with reference to FIGS. 1A, 1B, and 2A-2D.

At operation 308, the process 300 may include controlling, based at least in part on the first likelihood of availability and the second likelihood of availability, a vehicle to navigate to one of the first set of parking spaces or the second set of parking spaces.

Referring to FIG. 3B, operation 208 further comprises the following. At operation 310, the process 300 may include determining a first route to the first set of parking spaces and a second route to the second set of parking spaces. The first route may correspond to the first route 138 described with reference to FIGS. 1A and 1B and/or the first route 208 described with reference to FIGS. 2A-2D.

At operation 312, the process 300 may include determining a first cost associated with the first route by a cost function based on the first likelihood of availability, and a second cost associated with the second route by the cost function based on the second likelihood of availability. As described herein, the first/second likelihood of availability is the primary input of the cost function to determine the first/second cost associated with the first/second route. Additionally, other factors may be input to the cost function to determine the cost of the route. For example, the cost function may have inputs such as a distance from a current location of the vehicle to the first/second set of parking spaces, an estimated time from the current location of the vehicle to the first/second set of parking spaces, the proximity to other parking spaces, and so on. For example, the proximity to other parking spaces may be factored into the cost function because if the vehicle navigates along a route passing by other parking spaces, the vehicle may have a better chance to find parking spaces without having to reroute.

At operation 314, the process 300 may include determining whether the first cost associated with the first route is equal to or less than the second cost associated with the second route. For example, the vehicle may determine a route with the lowest cost within the threshold distance of the destination by comparing the costs of different routes.

At operation 316, the process 300 may include upon determining that the first cost associated with the first route is equal to or less than the second cost associated with the second route, causing the vehicle to navigate based on the first route. For example, the vehicle may be controlled to navigate the geographic region generally along a path corresponding to the first route. In addition to navigating to the first set of parking spaces, the vehicle may also generate data, e.g., sensor data, perception data, and/or the like, as the vehicle traverses the first route and update the parking database with the data in real time.

At operation 318, the process 300 may include causing the vehicle to park within one of the first set of parking spaces. In addition to parking within one of the one or more the first parking spaces, the vehicle may also send an instruction to update the database, e.g., to indicate that one of the one or more the first parking spaces is now occupied.

At operation 320, the process 300 may include upon determining that the first cost associated with the first route is greater than the second cost associated with the second route, causing the vehicle to navigate based on the second route. For example, the vehicle may be controlled to navigate the geographic region generally along a path corresponding to the second route. In addition to navigating to the second set of parking spaces, the vehicle may also generate data, e.g., sensor data, perception data, and/or the like, as the vehicle traverses the second route 140 and update the parking database with the data in real time.

At operation 322, the process 300 may include causing the vehicle to park within one of the second set of parking spaces. In addition to parking within one of the second set of parking spaces, the vehicle may also send an instruction to update the parking database, e.g., to indicate that one of the second set of parking spaces is now occupied.

In some examples, the first parking space and/or the second parking space may be occupied by other vehicles in the fleet. Since the vehicles in the fleet share the same database, other vehicles in the fleet may have the information that vehicle is coming to the first set of parking spaces and/or the second set of parking spaces. Thus, instead of immediately leaving, another vehicle in the fleet may hold an individual parking space of the first set of parking spaces and/or the second set of parking spaces for the vehicle for a period of time such as 5 minutes, 10 minutes, and so on such that the vehicle may have time to navigate to the first set of parking spaces and/or the second set of parking spaces to park.

FIGS. 1A, 1B, 3A, and 3B illustrate example processes in accordance with examples of the disclosure. These process (es) are illustrated as a logical flow graph, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and so on that perform particular functions or implement particular abstract data types. The order in which the operations are described is not intended to be construed as a limitation, and any number of the described operations may be omitted or combined in any order and/or in parallel to implement the processes.

Figure 4:
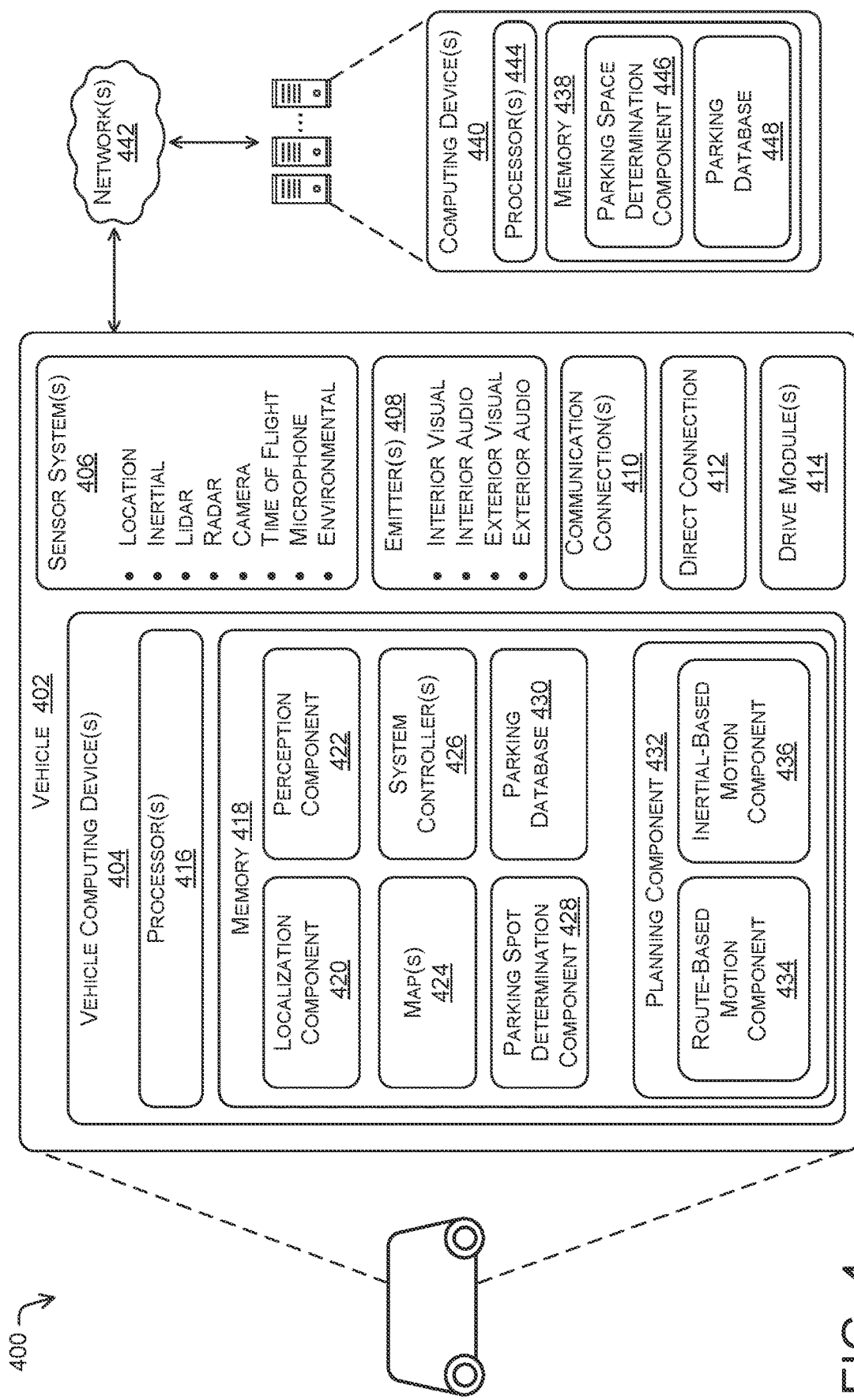
FIG. 4 depicts a block diagram of an example system for implementing the techniques discussed herein.

FIG. 4 is a block diagram of an example system 400 for implementing the techniques described herein. In at least one example, the system 400 may include a vehicle 402, such as an autonomous vehicle.

The vehicle 402 may include one or more vehicle computing devices 404, one or more sensor systems 406, emitter(s) 408, one or more communication connections 410, at least one direct connection 412, and one or more drive modules 414.

The vehicle computing device(s) 404 may include one or more processors 416 and memory 418 communicatively coupled with the processor(s) 416. In the illustrated example, the vehicle 402 is an autonomous vehicle; however, the vehicle 402 could be any other type of vehicle, such as a semi-autonomous vehicle, or any other system having at least an image capture device (e.g., a camera enabled smartphone). In the illustrated example, the memory 418 of the vehicle computing device(s) 404 stores a localization component 420, a perception component 422, one or more maps 424, one or more system controllers 426, a parking spot determination component 428, a parking database 430, and a planning component 432 including route-based motion component 434, and inertial-based motion component 436. Though depicted in FIG. 4 as residing in the memory 418 for illustrative purposes, it is contemplated that the localization component 420, the perception component 422, the map(s) 424, the system controller(s) 426, a parking spot determination component 428, a parking database 430, and the planning component 432 including the route-based motion component 434, and the inertial-based motion component 436, may additionally, or alternatively, be accessible to the vehicle 402 (e.g., stored on, or otherwise accessible by, memory remote from the vehicle 402, such as, for example, on memory 438 of a remote computing device(s) 440.

In at least one example, the localization component 420 may include functionality to receive sensor data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment and may continuously determine a location and/or orientation of the autonomous vehicle within the map. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 420 may provide data to various components of the vehicle 402 to determine an initial position of an autonomous vehicle for generating a one or more route-based trajectories and/or one or more inertial-based trajectories associated with vehicle travel on and off a route, as discussed herein.

In some instances, the perception component 422 may include functionality to perform object detection, segmentation, and/or classification. In some examples, the perception component 422 may provide processed sensor data that indicates a presence of an agent (e.g., entity) that is proximate to the vehicle 402 and/or a classification of the agent as an agent type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In some examples, the perception component 422 may provide object data associated with a detected object to the inertial-based motion component 436, such as for determining a corridor.

In additional or alternative examples, the perception component 422 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment may include, but are not limited to, a presence of another object in the environment, a state of another object in the environment, a time of day, a day of a week, a season, a weather condition, an indication of darkness/light, etc.

The memory 418 may further include the map(s) 424 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the map(s) 424. That is, the map(s) 424 may be used in connection with the localization component 420, the perception component 422, and/or the planning component 432 to determine a location of the vehicle 402, detect objects in an environment, identify parking zones and/or parking locations within an environment, and/or generate routes and/or trajectories to navigate within an environment, both based on a route-based reference system or an inertial based reference system.

In some examples, the map(s) 424 may be stored on a remote computing device(s) (such as the computing device(s) 440) accessible via network(s) 442. In some examples, multiple maps 424 may be stored based on, for example, a characteristic (e.g., type of entity, time of day, day of week, season of the year, etc.). Storing multiple maps 424 may have similar memory requirements, but increase the speed at which data in a map may be accessed.

In at least one example, the vehicle computing device(s) 404 may include the system controller(s) 426, which may be configured to control steering, propulsion, braking, safety, emitters, communication, and other systems of the vehicle 402. The system controller(s) 426 may communicate with and/or control corresponding systems of the drive module(s) 414 and/or other components of the vehicle 402.

In general, the planning component 432 may determine a path for the vehicle 402 to follow to traverse through an environment. For example, the planning component 432 may determine various routes and trajectories and various levels of detail. For example, the planning component 432 may determine a route to travel from a first location (e.g., a current location) to a second location (e.g., a target location). For the purpose of this discussion, a route may include a sequence of waypoints for traveling between two locations. As non-limiting examples, waypoints include streets, intersections, global positioning system (GPS) coordinates, etc. Further, the planning component 432 may generate an instruction for guiding the vehicle 402 along at least a portion of the route from the first location to the second location. In at least one example, the planning component 432 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 402 to navigate.

The route-based motion component 434 may be configured to determine one or more route-based trajectories for the vehicle 402 based on a route-based reference system. In some examples, the route-based reference system may include a route-centric reference frame. In such examples, locations in the environment, such as locations associated with detected objects, may be determined based on a distance and direction from the route. In various examples, the one or more route-based trajectories based on the route-based reference system may correspond to one or more actions associated with traveling on a route, such as continuing straight in a lane, lane change left, lane change right, and/or various velocities associated with the actions.

In various examples, the route-based motion component 434 may be configured to determine a cost associated with the one or more route-based trajectories based on the route-based reference system. The cost may be based on safety (e.g., avoiding a collision between the vehicle and the object), comfort (e.g., lack of abrupt movements), progress (e.g., movement toward destination), operating rules (e.g., rules of the road, laws, codes, regulations, etc.), or the like, such as those described in the U.S. Patent Application incorporated herein above.

The inertial-based motion component 436 may be configured to determine one or more off-route trajectories for the vehicle 402 based on an inertial-based reference system.

In various examples, the off-route trajectories may be determined based on an optimization associated with a reference trajectory, a corridor, and/or an initial trajectory. The optimization may be performed utilizing differential dynamic programming or any other optimization algorithm configured to determine a dynamically feasible trajectory.

In various examples, the inertial-based motion component 436 may initiate off-route trajectory determinations based on a determination that one or more conditions for off-route travel are satisfied. The conditions may include a determination that the vehicle 402 is within a first threshold distance (illustrated as D1) from a destination (e.g., goal), that a parking zone and/or parking location is identified, that the parking zone and/or parking location is within a second threshold distance of the destination, that the parking zone and/or parking location is unoccupied (e.g., no objects present in the parking zone and/or parking location), and/or that a length and width of the parking zone and/or parking location is visible to the vehicle 402 (e.g., visible to the perception component 422, not occluded).

In some examples, the inertial-based motion component 436 may initiate off-route trajectory determinations based on a determination that an emergency vehicle is detected in the environment and is relevant to the vehicle 402. In some examples, the emergency vehicle may be relevant to the vehicle 402 based on a determination that the emergency vehicle is emitting at least one of a flashing light or a siren. In some examples, the emergency vehicle may be relevant to the vehicle 402 based on a determination that an emergency vehicle trajectory is associated with the driving lane, the route, a direction of travel associated with the vehicle, or the like. In some examples, the emergency vehicle may be relevant to the vehicle 402 based on a determination, by the planning component 432, to yield thereto, such as that based on one or more of the factors (e.g., emergency vehicle trajectory, siren, lights, etc.). Based on a determination that the emergency vehicle is relevant to the vehicle 402, the inertial-based motion component 436 may determine one or more off-route trajectories, such as that associated with a pull-over action to yield to the emergency vehicle.

In various examples, the inertial-based motion component 436 may be configured to determine a cost associated with the one or more off-route trajectories. Similar to the costs described above with respect to the route-based trajectories, the costs associated with the off-route trajectories may be based on safety, comfort, progress, operating rules, or the like. In various examples, route-based motion component 434 and the inertial-based motion component 436 may determine the route-based and off-route trajectories and associated costs in parallel. In some examples, the planning component 432 may determine a trajectory (route-based trajectory or off-route trajectory) for operating the vehicle based on a lowest cost trajectory. In such examples, the planning component 432 may compare the costs associated with a route-based trajectory and an off-route trajectory from an initial location and may control the vehicle according to the trajectory with the lowest cost.

As can be understood, the components discussed herein (e.g., the localization component 420, the perception component 422, the map(s) 424, the system controller(s) 426, the planning component 432 including the route-based motion component 434 and the inertial-based motion component 436 are described as divided for illustrative purposes. However, the operations performed by the various components may be combined or performed in any other component.

In some instances, aspects of some or all of the components discussed herein may include any models, techniques, and/or machine learning techniques. For example, in some instances, the components in the memory 418 (and the memory 438, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet41, VGG, DenseNet, PointNet, and the like.

In at least one example, the sensor system(s) 406 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the LIDAR sensors may include individual LIDAR sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device(s) 404. Additionally or alternatively, the sensor system(s) 406 may send sensor data, via the one or more networks 440, to the one or more computing device(s) 440 at a particular frequency, after a lapse of a predetermined period of time, in near real-time, etc.

The vehicle 402 may also include emitter(s) 408 for emitting light and/or sound, as described above. The emitter(s) 408 in this example include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connection(s) 410 that enable communication between the vehicle 402 and one or more other local or remote computing device(s). For instance, the communication connection(s) 410 may facilitate communication with other local computing device(s) on the vehicle 402 and/or the drive module(s) 414. Also, the communication connection(s) 410 may allow the vehicle to communicate with other nearby computing device(s) and/or one or more remote computing device(s) 440 for receiving sensor data.

The communications connection(s) 410 may include physical and/or logical interfaces for connecting the vehicle computing device(s) 404 to another computing device or a network, such as network(s) 442. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include drive module(s) 414. In some examples, the vehicle 402 may have a single drive module 414. In at least one example, if the vehicle 402 has multiple drive modules 414, individual drive modules 414 may be positioned on opposite ends of the vehicle 402 (e.g., the front and the rear, etc.). In at least one example, the drive module(s) 414 may include one or more sensor systems to detect conditions of the drive module(s) 414 and/or the surroundings of the vehicle 402. By way of example and not limitation, the sensor system(s) 406 may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders may be unique to the drive module(s) 414. In some cases, the sensor system(s) on the drive module(s) 414 may overlap or supplement corresponding systems of the vehicle 402 (e.g., sensor system(s) 406).

The drive module(s) 414 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 414 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive module(s) 414. Furthermore, the drive module(s) 414 may also include one or more communication connection(s) that enable communication by the respective drive module with one or more other local or remote computing device(s).

In at least one example, the direct connection 412 may provide a physical interface to couple the one or more drive module(s) 414 with the body of the vehicle 402. For example, the direct connection 412 may allow the transfer of energy, fluids, air, data, etc. between the drive module(s) 414 and the vehicle. In some instances, the direct connection 412 may further releasably secure the drive module(s) 414 to the body of the vehicle 402.

In at least one example, the localization component 420, the perception component 422, the map(s) 424, the system controller(s) 426, the planning component 432 including the route-based motion component 434 and the inertial-based motion component 436, and various components thereof, may process the sensor data, as described above, and may send their respective outputs, over the one or more network(s) 442, to the computing device(s) 440. In at least one example, the localization component 420, the perception component 422, the map(s) 424, the system controller(s) 426, the planning component 432 including the route-based motion component 434, and the inertial-based motion component 436 may send their respective outputs to the computing device(s) 440 at a particular frequency, after a lapse of a predetermined period of time, in near real-time, etc.

In some examples, the vehicle 402 may send the sensor data to the computing device(s) 440 via the network(s) 442. In some examples, the vehicle 402 may receive sensor data from the computing device(s) 440 via the network(s) 442. The sensor data may include raw sensor data and/or processed sensor data and/or representations of sensor data. In some examples, the sensor data (raw or processed) may be sent and/or received as one or more log files.

The computing device(s) 440 may include processor(s) 442 and the memory 438 storing one or more maps, such as map(s) 424. In some instances, the computing device(s) 440 may be configured to perform one or more of the processes described herein with respect to the vehicle 402. In such instances, the computing device(s) 440 may send, to the vehicle 402, data representing results of the processing.

The memory 438 may at least include a parking space determination component 446 and a parking database 448. The parking space determination component 446 is configured to determine parking spaces. The parking database 448 is configured to store data associated with the parking spaces. The parking database 448 may be dynamically updated, for example, with sensor data collected by the vehicle 402, sensor data collected by the vehicles in the fleet, sensor data collected by drones, sensor data collected by a third party, data from other sources, or any combination thereof.

The processor(s) 416 of the vehicle 402 and the processor(s) 442 of the computing device(s) 440 may be any suitable processor capable of executing instructions to process data and perform operations as described herein. By way of example and not limitation, the processor(s) 416 and 444 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and 438 are examples of non-transitory computer-readable media. The memory 418 and 438 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 418 and 438 may include at least a working memory and a storage memory. For example, the working memory may be a high-speed memory of limited capacity (e.g., cache memory) that is used for storing data to be operated on by the processor(s) 416 and 444. In some instances, the memory 418 and 438 may include a storage memory that may be a lower-speed memory of a relatively large capacity that is used for long-term storage of data. In some cases, the processor(s) 416 and 444 cannot operate directly on data that is stored in the storage memory, and data may need to be loaded into a working memory for performing operations based on the data, as discussed herein.

It should be noted that while FIG. 4 is illustrated as a distributed system, in alternative examples, components of the vehicle 402 may be associated with the computing device(s) 440 and/or components of the computing device(s) 440 may be associated with the vehicle 402. That is, the vehicle 402 may perform one or more of the functions associated with the computing device(s) 440, and vice versa.

Example Clauses

A. An autonomous vehicle comprising: one or more processors; and one or more computer-readable media storing instructions that, when executed by the one or more processors, cause the autonomous vehicle to perform operations comprising: receiving a request to travel to a destination; obtaining, based at least in part on a database available to the autonomous vehicle, information about a first set of public parking spaces and a second set of public parking spaces within a threshold distance of the destination; determining, based at least in part on the information about the first set of public parking spaces and the second set of public parking spaces, a first likelihood of availability associated with the first set of public parking spaces and a second likelihood of availability associated with the second set of public parking spaces; determining a first route to the first set of public parking spaces, and a second route to the second set of public parking spaces; determining a first cost associated with the first route by a cost function based on the first likelihood of availability, and a second cost associated with the second route by the cost function based on the second likelihood of availability; determining whether the first cost associated with the first route is equal to or less than the second cost associated with the second route; and upon determining that the first cost associated with the first route is equal to or less than the second cost associated with the second route: causing the autonomous vehicle to navigate based on the first route; and causing the autonomous vehicle to park within one of the first set of public parking spaces.

B. The autonomous vehicle as recited in clause A, the operations further comprising: upon determining that the first cost associated with the first route is greater than the second cost associated with the second route: causing the autonomous vehicle to navigate based on the second route; and causing the autonomous vehicle to park within one of the second set of public parking spaces.

C. The autonomous vehicle as recited in any one of clauses A-B, wherein: the first set of public parking spaces is within a first distance of the destination; and the second set of public parking spaces is outside the first distance and within a second distance of the destination.

D. The autonomous vehicle as recited in any one of clauses A-C, further comprising a sensor, configured to generate sensor data along the first route and/or the second route as the autonomous vehicle traverses the first route and/or the second route, and update the database with the sensor data in real time.

E. The autonomous vehicle as recited in any one of clauses A-D, wherein the first likelihood of availability is determined based at least in part on one or more of: a priori probability, including a pattern of availability of the first set of public parking spaces related to a time of a day, a day of a week, and/or a special event; and a dynamically updated state, including most recent time points that individual public parking spaces of the first set of public parking spaces are identified as being vacant.

F. The autonomous vehicle as recited in any one of clauses A-E, wherein the database comprises, for an individual public parking space of the first set of public parking spaces: a location of the individual public parking space; information about restrictions associated with the individual public parking space; an indication that the individual public parking space is vacant or occupied; and a timestamp associated with the indication.

G. A method comprising: determining a first set of parking spaces and a second set of parking spaces; retrieving, from a database, information about the first set of parking spaces and the second set of parking spaces; determining, based at least in part on the information about the first set of parking spaces and the second set of parking spaces, a first likelihood of availability associated with the first set of parking spaces and a second likelihood of availability associated with the second set of parking spaces; and controlling, based at least in part on the first likelihood of availability and the second likelihood of availability, a vehicle to navigate to one of the first set of parking spaces or the second set of parking spaces.

H. The method as recited in clause G, wherein the controlling, based at least in part on the first likelihood of availability and the second likelihood of availability, the vehicle to navigate to one of the first set of parking spaces or the second set of parking spaces comprises: determining a first route to the first set of parking spaces, and a second route to the second set of parking spaces; determining a first cost associated with the first route by a cost function based on the first likelihood of availability, and a second cost associated with the second route by the cost function based on the second likelihood of availability; and determining whether the first cost associated with the first route is equal to or less than the second cost associated with the second route.

I. The method as recited in any one of clauses G-H, wherein the controlling, based at least in part on the first likelihood of availability and the second likelihood of availability, the vehicle to navigate to one of the first set of parking spaces or the second set of parking spaces further comprises: upon determining that the first cost associated with the first route is equal to or less than the second cost associated with the second route: causing the vehicle to navigate based on the first route; and causing the vehicle to park within one of the first set of parking spaces.

J. The method as recited in any one of clauses G-I, wherein the vehicle further comprises a sensor, configured to generate sensor data along the first route as the vehicle traverses the first route, and updates the database with the sensor data in real time.

K. The method as recited in any one of clauses G-J, wherein the controlling, based at least in part on the first likelihood of availability and the second likelihood of availability, the vehicle to navigate to one of the first set of parking spaces or the second set of parking spaces further comprises: upon determining that the first cost associated with the first route is greater than the second cost associated with the second route: causing the vehicle to navigate based on the second route; and causing the vehicle to park within one of the second set of parking spaces.

L. The method as recited in any one of clauses G-K, wherein: the first set of parking spaces is within a first distance of the destination; and the second set of parking spaces is outside the first distance and within a second distance of the destination.

M. The method as recited in any one of clauses G-L, wherein the first likelihood of availability is determined based at least in part on one or more of a priori probability, including a pattern of availability of the first set of parking spaces related to a time of a day, a day of a week, and/or a special event; and a dynamically updated input, including most recent time points that individual parking spaces of the first set of parking spaces are identified as being vacant.

N. A computer-readable medium storing instructions that, when executed by one or more processors, cause one or more computing devices to perform operations comprising: determining a first set of parking spaces and a second set of parking spaces; retrieving, from a database, information about the first set of parking spaces and the second set of parking spaces; determining, based at least in part on the information about the first set of parking spaces and the second set of parking spaces, a first likelihood of availability associated with the first set of parking spaces and a second likelihood of availability associated with the second set of parking spaces; and controlling, based at least in part on the first likelihood of availability and the second likelihood of availability, a vehicle to navigate to one of the first set of parking spaces or the second set of parking spaces.

O. The computer-readable medium as recited in clause N, wherein the controlling, based at least in part on the first likelihood of availability and the second likelihood of availability, the vehicle to navigate to one of the first set of parking spaces or the second set of parking spaces comprises: determining a first route to the first set of parking spaces, and a second route to the second set of parking spaces; determining a first cost associated with the first route by a cost function based on the first likelihood of availability, and a second cost associated with the second route by the cost function based on the second likelihood of availability; and determining whether the first cost associated with the first route is equal to or less than the second cost associated with the second route.

P. The computer-readable medium as recited in any one of clauses N-O, wherein the controlling, based at least in part on the first likelihood of availability and the second likelihood of availability, the vehicle to navigate to one of the first set of parking spaces or the second set of parking spaces further comprises: upon determining that the first cost associated with the first route is equal to or less than the second cost associated with the second route: causing the vehicle to navigate based on the first route; and causing the vehicle to park within one of the first set of parking spaces.

Q. The computer-readable medium as recited in any one of clauses N-P, wherein the vehicle further comprises a sensor, configured to generate sensor data along the first route as the vehicle traverses the first route, and updates the database with the sensor data in real time.

R. The computer-readable medium as recited in any one of clauses N-Q, wherein the controlling, based at least in part on the first likelihood of availability and the second likelihood of availability, the vehicle to navigate to one of the first set of parking spaces or the second set of parking spaces further comprises: upon determining that the first cost associated with the first route is greater than the second cost associated with the second route: causing the vehicle to navigate based on the second route; and causing the vehicle to park within one of the second set of parking spaces.

S. The computer-readable medium as recited in any one of clauses N-R, wherein: the first set of parking spaces is within a first distance of the destination; and the second set of parking spaces is outside the first distance and within a second distance of the destination.

T. The computer-readable medium as recited in any one of clauses N-S, wherein the first likelihood of availability is determined based at least in part on one or more of: a priori probability, including a pattern of availability of the first set of parking spaces related to a time of a day, a day of a week, and/or a special event; and a dynamically updated input, including most recent time points that individual parking spaces of the first set of parking spaces are identified as being vacant.

While the example clauses described above are described with respect to one particular implementation, it should be understood that, in the context of this document, the content of the example clauses may also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. An autonomous vehicle comprising:
   one or more processors; and
   one or more non-transitory computer-readable media storing instructions that, when executed by the one or more processors, cause the autonomous vehicle to perform operations comprising:
      receiving a request to travel to a destination;
      identifying a first set of public parking spaces within a first distance of the destination;
      identifying a second set of public parking spaces that are located outside the first distance and within a second distance of the destination;
      obtaining, based at least in part on a database available to the autonomous vehicle, information about the first set of public parking spaces and the second set of public parking spaces, wherein the database is updated based at least in part on sensor data captured by a fleet of autonomous vehicles;
      determining, based at least in part on the information about the first set of public parking spaces and the second set of public parking spaces, a first likelihood of availability associated with the first set of public parking spaces and a second likelihood of availability associated with the second set of public parking spaces;
      determining a first route to the first set of public parking spaces, and a second route to the second set of public parking spaces;
      determining a first cost associated with the first route by a cost function based on the first likelihood of availability, and a second cost associated with the second route by the cost function based on the second likelihood of availability;
      determining whether the first cost associated with the first route is equal to or less than the second cost associated with the second route; and
      upon determining that the first cost associated with the first route is equal to or less than the second cost associated with the second route:
         causing the autonomous vehicle to navigate based on the first route; and
         causing the autonomous vehicle to park within one of the first set of public parking spaces.

2. The autonomous vehicle as recited in claim 1, the operations further comprising:
   upon determining that the first cost associated with the first route is greater than the second cost associated with the second route:
   causing the autonomous vehicle to navigate based on the second route; and
   causing the autonomous vehicle to park within one of the second set of public parking spaces.

3. The autonomous vehicle as recited in claim 2, further comprising a sensor, configured to generate second sensor data along the first route and/or the second route as the autonomous vehicle traverses the first route and/or the second route, and update the database with the second sensor data in real time.

4. The autonomous vehicle as recited in claim 1, wherein the first likelihood of availability is determined based at least in part on one or more of:
   a priori probability, including a pattern of availability of the first set of public parking spaces related to a time of a day, a day of a week, and/or a special event; and
   a dynamically updated state, including most recent time points that individual public parking spaces of the first set of public parking spaces are identified as being vacant.

5. The autonomous vehicle as recited in claim 1, wherein the database comprises, for an individual public parking space of the first set of public parking spaces:
   a location of the individual public parking space;
   information about restrictions associated with the individual public parking space;
   an indication that the individual public parking space is vacant or occupied; and
   a timestamp associated with the indication.

6. A method comprising:
   determining a first set of parking spaces within a first distance of a destination and a second set of parking spaces that are located outside the first distance and within a second distance of the destination;
   retrieving, from a database, information about the first set of parking spaces and the second set of parking spaces, wherein the database is updated based at least in part on sensor data captured by a fleet of autonomous vehicles;
   determining, based at least in part on the information about the first set of parking spaces and the second set of parking spaces, a first likelihood of availability associated with the first set of parking spaces and a second likelihood of availability associated with the second set of parking spaces; and
   controlling, based at least in part on the first likelihood of availability and the second likelihood of availability, a vehicle to navigate to one of the first set of parking spaces or the second set of parking spaces.

7. The method as recited in claim 6, wherein the controlling, based at least in part on the first likelihood of availability and the second likelihood of availability, the vehicle to navigate to one of the first set of parking spaces or the second set of parking spaces comprises:
   determining a first route to the first set of parking spaces, and a second route to the second set of parking spaces;

determining a first cost associated with the first route by a cost function based on the first likelihood of availability, and a second cost associated with the second route by the cost function based on the second likelihood of availability; and determining whether the first cost associated with the first route is equal to or less than the second cost associated with the second route.

8. The method as recited in claim 7, wherein the controlling, based at least in part on the first likelihood of availability and the second likelihood of availability, the vehicle to navigate to one of the first set of parking spaces or the second set of parking spaces further comprises:

upon determining that the first cost associated with the first route is equal to or less than the second cost associated with the second route:

causing the vehicle to navigate based on the first route; and causing the vehicle to park within one of the first set of parking spaces.

9. The method as recited in claim 8, wherein the vehicle further comprises a sensor, configured to generate second sensor data along the first route as the vehicle traverses the first route, and update the database with the second sensor data in real time.

10. The method as recited in claim 7, wherein the controlling, based at least in part on the first likelihood of availability and the second likelihood of availability, the vehicle to navigate to one of the first set of parking spaces or the second set of parking spaces further comprises:

upon determining that the first cost associated with the first route is greater than the second cost associated with the second route:

causing the vehicle to navigate based on the second route; and causing the vehicle to park within one of the second set of parking spaces.

11. The method as recited in claim 6, wherein the first likelihood of availability is determined based at least in part on one or more of:

a priori probability, including a pattern of availability of the first set of parking spaces related to a time of a day, a day of a week, and/or a special event; and a dynamically updated input, including most recent time points that individual parking spaces of the first set of parking spaces are identified as being vacant.

12. A computer-readable medium storing instructions that, when executed by one or more processors, cause one or more computing devices to perform operations comprising:

determining a first set of parking spaces within a first distance of a destination and a second set of parking spaces that are located outside the first distance and within a second distance of the destination;

retrieving, from a database, information about the first set of parking spaces and the second set of parking spaces, wherein the database is updated based at least in part on sensor data captured by a fleet of autonomous vehicles;

determining, based at least in part on the information about the first set of parking spaces and the second set of parking spaces, a first likelihood of availability associated with the first set of parking spaces and a second likelihood of availability associated with the second set of parking spaces; and controlling, based at least in part on the first likelihood of availability and the second likelihood of availability, a vehicle to navigate to one of the first set of parking spaces or the second set of parking spaces.

13. The computer-readable medium as recited in claim 12, wherein the controlling, based at least in part on the first likelihood of availability and the second likelihood of availability, the vehicle to navigate to one of the first set of parking spaces or the second set of parking spaces comprises:

determining a first route to the first set of parking spaces, and a second route to the second set of parking spaces;

determining a first cost associated with the first route by a cost function based on the first likelihood of availability, and a second cost associated with the second route by the cost function based on the second likelihood of availability; and determining whether the first cost associated with the first route is equal to or less than the second cost associated with the second route.

14. The computer-readable medium as recited in claim 13, wherein the controlling, based at least in part on the first likelihood of availability and the second likelihood of availability, the vehicle to navigate to one of the first set of parking spaces or the second set of parking spaces further comprises:

upon determining that the first cost associated with the first route is equal to or less than the second cost associated with the second route:

causing the vehicle to navigate based on the first route; and causing the vehicle to park within one of the first set of parking spaces.

15. The computer-readable medium as recited in claim 14, wherein the vehicle further comprises a sensor, configured to generate second sensor data along the first route as the vehicle traverses the first route, and updates the database with the second sensor data in real time.

16. The computer-readable medium as recited in claim 13, wherein the controlling, based at least in part on the first likelihood of availability and the second likelihood of availability, the vehicle to navigate to one of the first set of parking spaces or the second set of parking spaces further comprises:

upon determining that the first cost associated with the first route is greater than the second cost associated with the second route:

causing the vehicle to navigate based on the second route; and causing the vehicle to park within one of the second set of parking spaces.

17. The computer-readable medium as recited in claim 12, wherein the first likelihood of availability is determined based at least in part on one or more of:

a priori probability, including a pattern of availability of the first set of parking spaces related to a time of a day, a day of a week, and/or a special event; and a dynamically updated input, including most recent time points that individual parking spaces of the first set of parking spaces are identified as being vacant.

18. The autonomous vehicle as recited in claim 1, wherein the first distance and the second distance are within a threshold distance.

19. The method as recited in claim 6, wherein the first distance and the second distance are within a threshold distance.

20. The computer-readable medium as recited in claim 12, wherein the first distance and the second distance are within a threshold distance.

* * * * *